United States Patent
Lercari et al.

(10) Patent No.: US 11,321,237 B1
(45) Date of Patent: May 3, 2022

(54) IDEALIZED NONVOLATILE OR PERSISTENT STORAGE WITH STRUCTURE-DEPENDENT SPARE CAPACITY SWAPPING

(71) Applicant: Radian Memory Systems, Inc., Calabasas, CA (US)

(72) Inventors: Robert Lercari, Thousand Oaks, CA (US); Alan Chen, Simi Valley, CA (US); Mike Jadon, Manhattan Beach, CA (US); Craig Robertson, Simi Valley, CA (US); Andrey V. Kuzmin, Moscow (RU)

(73) Assignee: Radian Memory Systems, Inc., Manhattan Beach, CA (US)

( * ) Notice: Subject to any disclaimer, the term of this patent is extended or adjusted under 35 U.S.C. 154(b) by 0 days.

(21) Appl. No.: 16/779,906

(22) Filed: Feb. 3, 2020

Related U.S. Application Data

(63) Continuation of application No. 15/690,006, filed on Aug. 29, 2017, now Pat. No. 10,642,748, which is a
(Continued)

(51) Int. Cl.
*G06F 12/1009* (2016.01)
*G06F 3/06* (2006.01)
(Continued)

(52) U.S. Cl.
CPC .......... *G06F 12/1009* (2013.01); *G06F 3/064* (2013.01); *G06F 3/0616* (2013.01);
(Continued)

(58) Field of Classification Search
None
See application file for complete search history.

(56) References Cited

U.S. PATENT DOCUMENTS

| 5,568,423 A | 10/1996 | Jou et al. |
| 5,652,857 A | 7/1997 | Shimoi et al. |

(Continued)

FOREIGN PATENT DOCUMENTS

WO 2009100149 A1 8/2009

OTHER PUBLICATIONS

U.S. Appl. No. 13/767,723, Kuzmin, Issued—U.S. Pat. No. 9,652,376.
(Continued)

*Primary Examiner* — Stephanie Wu
(74) *Attorney, Agent, or Firm* — Marc P. Schuyler

(57) ABSTRACT

This disclosure provides techniques hierarchical address virtualization within a memory controller and configurable block device allocation. By performing address translation only at select hierarchical levels, a memory controller can be designed to have predictable I/O latency, with brief or otherwise negligible logical-to-physical address translation time. In one embodiment, address transition may be implemented entirely with logical gates and look-up tables of a memory controller integrated circuit, without requiring processor cycles. The disclosed virtualization scheme also provides for flexibility in customizing the configuration of virtual storage devices, to present nearly any desired configuration to a host or client.

28 Claims, 10 Drawing Sheets

Related U.S. Application Data continuation of application No. 15/074,778, filed on Mar. 18, 2016, now Pat. No. 9,785,572, which is a continuation of application No. 14/880,529, filed on Oct. 12, 2015, now Pat. No. 9,542,118, which is a continuation-in-part of application No. 14/848,273, filed on Sep. 8, 2015, now Pat. No. 10,642,505.

(60) Provisional application No. 62/199,969, filed on Jul. 31, 2015, provisional application No. 62/194,172, filed on Jul. 17, 2015, provisional application No. 62/063,357, filed on Oct. 13, 2014, provisional application No. 62/048,162, filed on Sep. 9, 2014.

(51) Int. Cl.
*G06F 12/109* (2016.01)
*G06F 12/02* (2006.01)

(52) U.S. Cl.
CPC ........ *G06F 3/0688* (2013.01); *G06F 12/0246* (2013.01); *G06F 12/109* (2013.01); *G06F 3/0659* (2013.01); *G06F 3/0662* (2013.01); *G06F 2212/1016* (2013.01); *G06F 2212/7201* (2013.01); *G06F 2212/7202* (2013.01); *G06F 2212/7205* (2013.01)

(56) References Cited

U.S. PATENT DOCUMENTS

| | | | |
|---|---|---|---|
| 5,860,082 A | 1/1999 | Smith et al. | |
| 6,134,631 A | 10/2000 | Jennings, III | |
| 7,096,378 B2 | 8/2006 | Stence et al. | |
| 7,339,823 B2 | 3/2008 | Nakayama et al. | |
| 7,404,031 B2 | 7/2008 | Oshima | |
| 7,406,563 B1 | 7/2008 | Nagashain | |
| 7,581,078 B2 | 8/2009 | Ware | |
| 7,702,846 B2 | 4/2010 | Nakanishi et al. | |
| 7,710,777 B1 | 5/2010 | Mintierth | |
| 7,752,381 B2 | 7/2010 | Wong | |
| 7,801,561 B2 | 9/2010 | Parikh et al. | |
| 7,818,489 B2 | 10/2010 | Karamcheti et al. | |
| 7,836,244 B2 | 11/2010 | Kim et al. | |
| 7,861,122 B2 | 12/2010 | Cornwell et al. | |
| 7,941,692 B2 | 5/2011 | Royer et al. | |
| 7,970,983 B2 | 6/2011 | Nochimowski | |
| 7,991,944 B2 | 8/2011 | Lee et al. | |
| 8,001,318 B1 | 8/2011 | Iyer | |
| 8,024,545 B2 | 9/2011 | Kim | |
| 8,055,833 B2 | 11/2011 | Danilak et al. | |
| 8,065,471 B2 | 11/2011 | Yano et al. | |
| 8,065,473 B2 | 11/2011 | Ito et al. | |
| 8,068,365 B2 | 11/2011 | Kim | |
| 8,072,463 B1 | 12/2011 | Van Dyke | |
| 8,074,022 B2 | 12/2011 | Okin et al. | |
| 8,082,389 B2 | 12/2011 | Fujibayashi | |
| 8,086,790 B2 | 12/2011 | Roohparvar | |
| 8,347,042 B2 | 1/2013 | Kou | |
| 8,539,197 B1 | 9/2013 | Marshall | |
| 8,572,331 B2 | 10/2013 | Shalvi | |
| 8,645,634 B1 | 2/2014 | Cox | |
| 9,229,854 B1 | 1/2016 | Kuzmin et al. | |
| 9,335,939 B2 | 5/2016 | Bennett et al. | |
| 9,400,749 B1 | 7/2016 | Kuzmin et al. | |
| 9,519,578 B1 | 12/2016 | Kuzmin et al. | |
| 9,542,118 B1 | 1/2017 | Lercari et al. | |
| 9,588,904 B1 | 3/2017 | Lercari et al. | |
| 9,652,376 B2 | 5/2017 | Kuzmin et al. | |
| 9,696,917 B1 | 7/2017 | Sareena | |
| 9,710,377 B1 | 7/2017 | Kuzmin et al. | |
| 9,727,454 B2 | 8/2017 | Kuzmin et al. | |
| 9,785,572 B1 | 10/2017 | Lercari et al. | |
| 9,846,541 B2 | 12/2017 | Miyamoto | |
| 10,445,229 B1 | 10/2019 | Kuzmin et al. | |
| 10,552,058 B1 | 2/2020 | Jadon et al. | |
| 10,552,085 B1 | 2/2020 | Chen et al. | |
| 2003/0028733 A1 | 2/2003 | Tsunoda et al. | |
| 2003/0065866 A1 | 4/2003 | Spencer | |
| 2005/0144413 A1* | 6/2005 | Kuo | G06F 13/4243 711/170 |
| 2006/0022171 A1 | 10/2006 | Maeda et al. | |
| 2007/0046681 A1 | 3/2007 | Nagashima | |
| 2007/0058431 A1 | 3/2007 | Chung et al. | |
| 2007/0143569 A1 | 6/2007 | Sanders | |
| 2007/0233939 A1 | 10/2007 | Kim | |
| 2007/0260811 A1 | 11/2007 | Merry, Jr. et al. | |
| 2007/0283428 A1 | 12/2007 | Ma et al. | |
| 2008/0034153 A1 | 2/2008 | Lee | |
| 2008/0082596 A1 | 4/2008 | Gorobets | |
| 2008/0126690 A1 | 5/2008 | Rajan | |
| 2008/0147964 A1 | 6/2008 | Chow et al. | |
| 2008/0155204 A1 | 6/2008 | Qawami et al. | |
| 2008/0189485 A1 | 8/2008 | Jung et al. | |
| 2008/0320476 A1 | 12/2008 | Wingard | |
| 2009/0036163 A1 | 2/2009 | Kimbrell | |
| 2009/0046533 A1 | 2/2009 | Jo | |
| 2009/0083478 A1 | 3/2009 | Kunimatsu | |
| 2009/0089482 A1 | 4/2009 | Traister | |
| 2009/0089490 A1 | 4/2009 | Ozawa et al. | |
| 2009/0172219 A1 | 7/2009 | Mardiks | |
| 2009/0172250 A1 | 7/2009 | Allen et al. | |
| 2009/0172257 A1* | 7/2009 | Prins | G11C 7/1063 711/103 |
| 2009/0198946 A1 | 8/2009 | Ebata | |
| 2009/0254705 A1 | 10/2009 | Abali et al. | |
| 2009/0271562 A1 | 10/2009 | Sinclair | |
| 2009/0300015 A1 | 12/2009 | Kazan et al. | |
| 2009/0327602 A1 | 12/2009 | Moore et al. | |
| 2010/0191779 A1 | 1/2010 | Hinrichs | |
| 2010/0042655 A1 | 2/2010 | Tse et al. | |
| 2010/0115172 A1 | 5/2010 | Gillingham et al. | |
| 2010/0161882 A1 | 6/2010 | Stern et al. | |
| 2010/0162012 A1 | 6/2010 | Cornwell et al. | |
| 2010/0182838 A1 | 7/2010 | Kim et al. | |
| 2010/0241866 A1 | 9/2010 | Rodorff | |
| 2010/0262761 A1* | 10/2010 | Borchers | G06F 3/0679 711/103 |
| 2010/0262762 A1 | 10/2010 | Borchers | |
| 2010/0262773 A1 | 10/2010 | Borchers | |
| 2010/0281230 A1 | 11/2010 | Rabii et al. | |
| 2010/0287217 A1 | 11/2010 | Borchers et al. | |
| 2010/0287327 A1 | 11/2010 | Li | |
| 2010/0312976 A1* | 12/2010 | Kaneda | G06F 3/0605 711/162 |
| 2010/0329011 A1 | 12/2010 | Lee et al. | |
| 2011/0033548 A1 | 2/2011 | Kimmel et al. | |
| 2011/0055445 A1 | 3/2011 | Gee et al. | |
| 2011/0153911 A1 | 6/2011 | Sprouse | |
| 2011/0161784 A1 | 6/2011 | Sellinger et al. | |
| 2011/0197023 A1 | 8/2011 | Iwamitsu et al. | |
| 2011/0238943 A1 | 9/2011 | Devendran et al. | |
| 2011/0276756 A1* | 11/2011 | Bish | G06F 3/0614 711/112 |
| 2011/0296133 A1 | 12/2011 | Flynn et al. | |
| 2011/0314209 A1 | 12/2011 | Eckstein | |
| 2012/0033519 A1 | 2/2012 | Confalonier et al. | |
| 2012/0054419 A1 | 3/2012 | Chen | |
| 2012/0059972 A1 | 3/2012 | Chen | |
| 2012/0066441 A1 | 3/2012 | Weingarten | |
| 2012/0131270 A1 | 5/2012 | Hemmi | |
| 2012/0131381 A1 | 5/2012 | Eleftheriou | |
| 2012/0159039 A1 | 6/2012 | Kegal | |
| 2012/0204079 A1 | 8/2012 | Takefman et al. | |
| 2013/0007343 A1 | 1/2013 | Rub | |
| 2013/0013852 A1 | 1/2013 | Hou et al. | |
| 2013/0019062 A1 | 1/2013 | Bennett et al. | |
| 2013/0073816 A1 | 3/2013 | Seo et al. | |
| 2013/0111295 A1 | 5/2013 | Li et al. | |
| 2013/0124793 A1* | 5/2013 | Gyl | G06F 12/0246 711/103 |
| 2013/0166825 A1 | 6/2013 | Kim et al. | |
| 2013/0242425 A1 | 9/2013 | Zayas et al. | |
| 2013/0290619 A1 | 10/2013 | Knight | |
| 2013/0297852 A1 | 11/2013 | Fai et al. | |

(56) References Cited

U.S. PATENT DOCUMENTS

| | | | |
|---|---|---|---|
| 2013/0332656 | A1 | 12/2013 | Kandiraju |
| 2014/0101371 | A1 | 4/2014 | Nguyen et al. |
| 2014/0122781 | A1* | 5/2014 | Smith ............... G06F 12/0246 711/103 |
| 2014/0189209 | A1 | 7/2014 | Sinclair et al. |
| 2014/0208004 | A1* | 7/2014 | Cohen ............... G06F 12/0246 711/103 |
| 2014/0208062 | A1* | 7/2014 | Cohen ............... G06F 3/0688 711/206 |
| 2014/0215129 | A1 | 7/2014 | Kuzmin et al. |
| 2014/0297949 | A1 | 10/2014 | Nagakawa |
| 2015/0046670 | A1* | 2/2015 | Kim ............... G06F 11/1471 711/207 |
| 2015/0113203 | A1 | 4/2015 | Dancho et al. |
| 2015/0134930 | A1 | 5/2015 | Huang |
| 2015/0149789 | A1 | 5/2015 | Seo et al. |
| 2015/0212938 | A1 | 6/2015 | Chen et al. |
| 2015/0193148 | A1 | 7/2015 | Miwa |
| 2015/0261456 | A1 | 9/2015 | Alcantara et al. |
| 2015/0324264 | A1 | 11/2015 | Vidypoornachy et al. |
| 2015/0347296 | A1 | 12/2015 | Kotte et al. |
| 2015/0355965 | A1 | 12/2015 | Peddle |
| 2015/0378886 | A1 | 12/2015 | Nemazie |
| 2016/0018998 | A1 | 1/2016 | Mohan et al. |
| 2016/0019159 | A1 | 1/2016 | Ueda |
| 2016/0026564 | A1 | 1/2016 | Manning |
| 2016/0357462 | A1 | 12/2016 | Nam et al. |
| 2016/0364179 | A1 | 12/2016 | Tsai et al. |
| 2017/0031699 | A1 | 2/2017 | Banerjee |

OTHER PUBLICATIONS

U.S. Appl. No. 14/466,167, Kuzmin, Issued—U.S. Pat. No. 9,727,454.
U.S. Appl. No. 15/009,275, Kuzmin, Issued—U.S. Pat. No. 9,400,749.
U.S. Appl. No. 15/625,931, Kuzmin, on appeal, appeal docket No. 2019-005230.
U.S. Appl. No. 15/625,946, Kuzmin, pending.
U.S. Appl. No. 14/047,193, Kuzmin, Issued—U.S. Pat. No. 9,229,854.
U.S. Appl. No. 14/951,708, Kuzmin, Issued—U.S. Pat. No. 9,519,578.
U.S. Appl. No. 15/346,641, Kuzmin, Issued—U.S. Pat. No. 9,710,377.
U.S. Appl. No. 15/621,888, Kuzmin, Issued—U.S. Pat. No. 1,044,5229.
U.S. Appl. No. 16/570,922, Kuzmin, pending.
U.S. Appl. No. 16/751,925, Kuzmin, pending.
U.S. Appl. No. 14/848,273, Kuzmin, on appeal, appeal docket No. 2018-008814.
U.S. Appl. No. 14/880,529, Lercari, U.S. Pat. No. 9,542,118.
U.S. Appl. No. 15/053,372, Lercari, U.S. Pat. No. 9,588,904.
U.S. Appl. No. 15/074,778, Lercari, U.S. Pat. No. 9,785,572.
U.S. Appl. No. 15/690,006, Lercari, allowed.
U.S. Appl. No. 15/211,927, Jadon, U.S. Pat. No. 10,552,058.
U.S. Appl. No. 16/591,735, Jadon, pending.
U.S. Appl. No. 15/211,939, Chen, U.S. Pat. No. 10,552,085.
U.S. Appl. No. 16/702,736, Chen, pending.
U.S. Appl. No. 16/707,934, Lercari, pending.
NVM Express, Version 1.0b, Jul. 12, 2011, pp. 1-126, published at http://www.nvmexpress.org/resources/ by the NVM Express Work Group.
John D. Strunk, "Hybrid Aggregates: Combining SSDs and HDDs in a single storage pool," Dec. 15, 2012, ACM SIGOPS Operating Systems Review archive, vol. 46 Issue 3, Dec. 2012, pp. 50-56.
Yiying Zhang, Leo Prasath Arulraj, Andrea C. Arpaci-Dusseau, Remzi H. Arpaci-Dusseau, Computer Sciences Department, University of Wisconsin-Madison, "De-indirection for Flash-based SSDs with NamelessWrites," published at https://www.usenix.org/conference/fast12/de-indirection-flash-based-ssds-nameless-writes, Feb. 7, 2012, pp. 1-16.
Andrea C. Arpaci-Dusseau, Remzi H. Arpaci-Dusseau, and Vijayan Prabhakaran, "ResearchRemoving the Costs of Indirection in Flash-based SSDs with NamelessWrites," Jun. 22, 2010, pp. 1-5, published at www.cs.wisc.edu/wind/Publications/hotstorage10-nameless.pdf by Computer Sciences Department, University of Wisconsin-Madison and Microsoft Research.
Stan Park and Kai Shen, Department of Computer Science, University of Rochester, "FIOS: A Fair, Efficient Flash I/O Scheduler," Feb. 23, 2012, pp. 1-15, published at www.usenix.org/event/fast12/tech/full_papers/Park.pdf by the Advanced Computing Systems Association, Fast'12, 10th Usenix Conference on File and Storage Technologies, San Jose.
Eric Seppanen, Matthew T. O'Keefe, David J. Lilja, Department of Electrical and Computer Engineering, University of Minnesota, "High Performance Solid State Storage Under Linux," Apr. 10, 2010, MSST '10 Proceedings of the 2010 IEEE 26th Symposium on Mass Storage Systems and Technologies (MSST), pp. 1-12.
Xiangyong Ouyangyz, David Nellansy, Robert Wipfely, David Flynny, Dhabaleswar K. Pandaz, "Beyond Block I/O: Rethinking Traditional Storage Primitives," Aug. 20, 2011, published at http://www.sciweavers.org/read/beyond-block-i-o-rethinking-traditional-st- orage-primitives-327868, by Fusion 10 and the Ohio State University.
Intel Corp, PCI-SIG SR-IOV Primer—An Introduction to SR-IOV Technology,: 321211-002, Revision 2.5, Jan. 2011, 28 pages.
Open NAND Flash Interface (ONFI), specification, version 2.0, 174 pp. Feb. 27, 2008.
Open NAND Flash Interface (ONFI), specification, version 3.1, 296 pages Sep. 19, 2012.
NVM Express, V. 1.2.1, 217 pages, Jun. 3, 2016.
Garth Gibson, Greg Ganger, "Principles of Operation for Shingled Disk Devices," Canregie Mellon Parallel Data Laboratory, CMU-PDL-11-107, Apr. 2011, 9 pages.
Li-Pin Chang, "Hybrid Solid State Disks: Combining Heterogeneous NAND Flash in Large SSDs," National Chiao-Tung University, Taiwan, ASPDAC 2008, 26 pages.
Hua Wangx, Ping Huangxz, Shuang Hex, Ke Zhoux, Chunhua Lix, and Xubin He, "A Novel I/O Scheduler for SSD with mproved Performance and Lifetime," Mass Storage Systems and Technologies (MSST), 2013 IEEE 29th Symposium an, May 6-10, 2013, 5 pages.
Altera Corp, et al., "Hybrid Memory Cube" specification, 2012, 122 pages.
JEDEC Standard, JESD229, Wide IO, Dec. 2011, 74 pages.
Li-Pin Chang, "Hybrid Solid State Disks: Combining Heterogeneous NAND Flash in Large SSDs," National Chiao-Tung University, Taiwan, 978-1-4244-1922-7/08, 2008 IEEE, 6 pages.
Optimizing NAND Flash Performance, Flash Memory Summit, Santa Clara, CA USA Aug. 2008, Ryan Fisher, pp. 1-23.
High-Speed NAND Flash: Design Considerations to Maximize Performance, Flash Memory Summit, Santa Clara, CA USA Aug. 11, 2009, , Robert Pierce, pp. 1-19.
NAND 201: An Update on the Continued Evolution of NAND Flash, Jim Cooke, Micron White Paper, Sep. 6, 2011, pp. 1-10.
Spansion SLC NAND Flash Memory for Embedded, data sheet, S34ML01G1, S34ML02G1, S34ML04G1, Sep. 6, 2012, pp. 1-73.
Wang et al., "An Efficient Design and Implementation of LSM-Tree based Key-Value Store on Open Channel SSD," EuroSys '14 Proceedings of the Ninth European Conference on Computer Systems, Article No. 16, Apr. 14, 2014, 14 pages.
Ouyang et al., "SDF: Software-defined flash for web-scale internet storage systems," Computer Architecture News—ASPLOS '14, vol. 42 Issue 1, Mar. 2014, 14 pages.
Macko et al., "Tracking Back References in a Write-Anywhere File System," FAST'10 Proceedings of the 8th USENIX conference on File and storage technologies, 14 pages, Feb. 23, 2010.
Ohad, Rodeh, "IBM Research Report Defragmentation Mechanisms for Copy-on-Write File-systems," IBM white paper, Apr. 26, 2010, 10 pages, available at domino.watson.ibm.com/library/CyberDig.nsf/papers/298A0EF3C2CDB17B852577070056B41F/$File/rj10465.pdf.
Cornwell, "Anatomy of a solid state drive," Oct. 17, 2012, ACMQUEUE, 13 pages.

\* cited by examiner

Multi-Modal Flash Memory Control

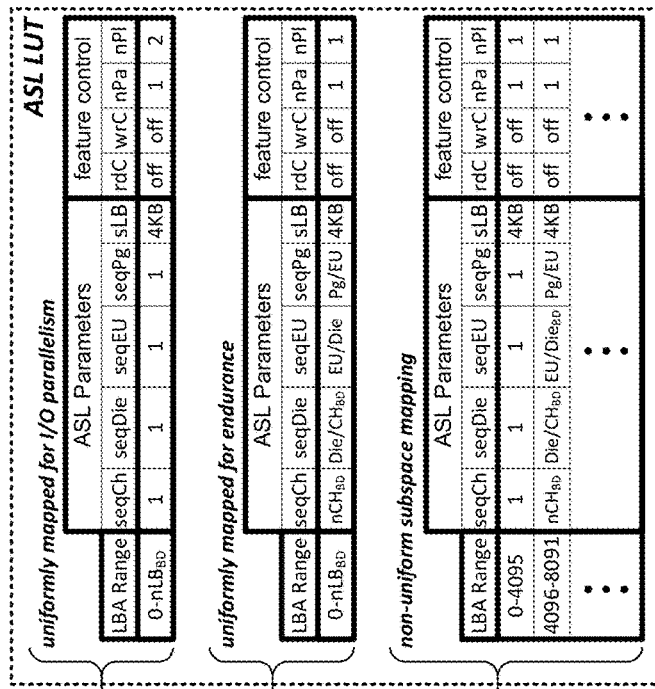
FIG. 4
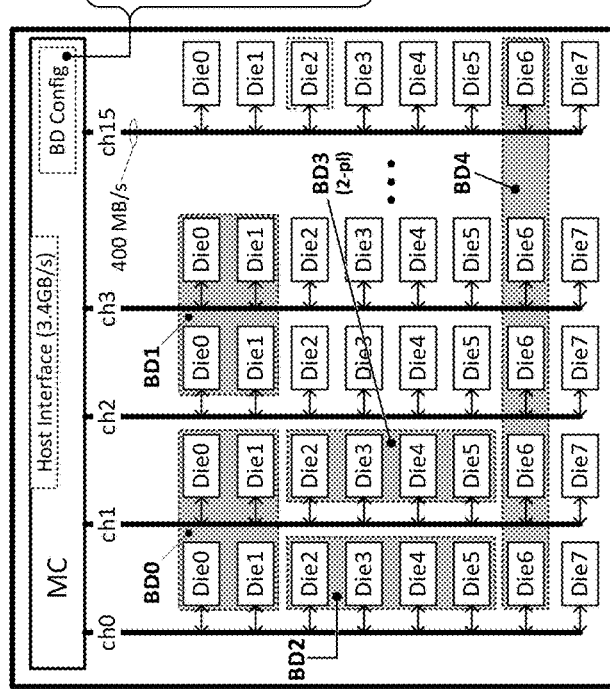
FIG. 5
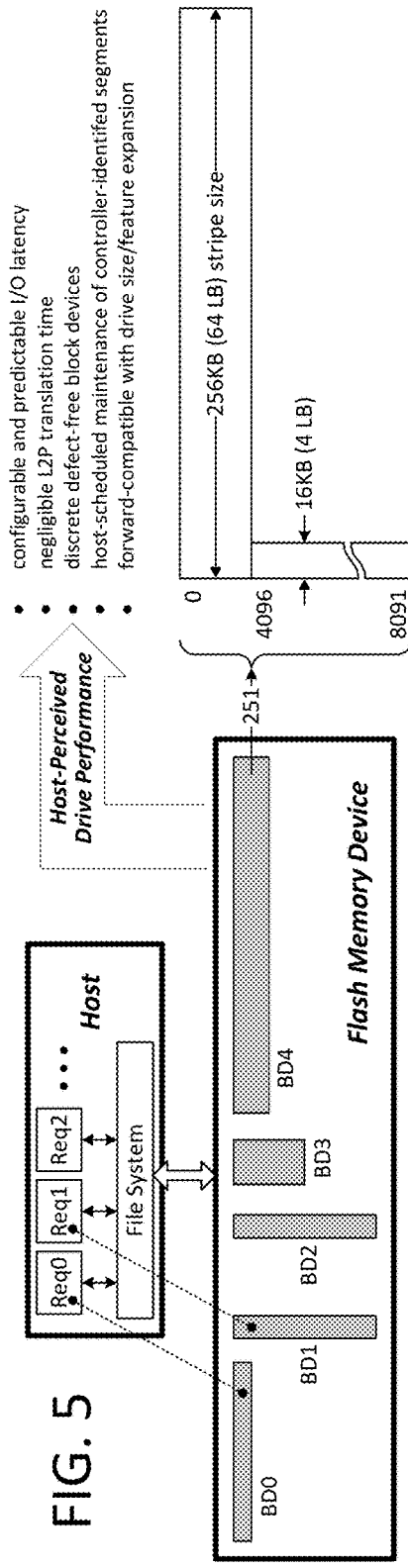

Configurable and predictable I/O latency

Negligible L2P translation time

Discrete defect-free block devices

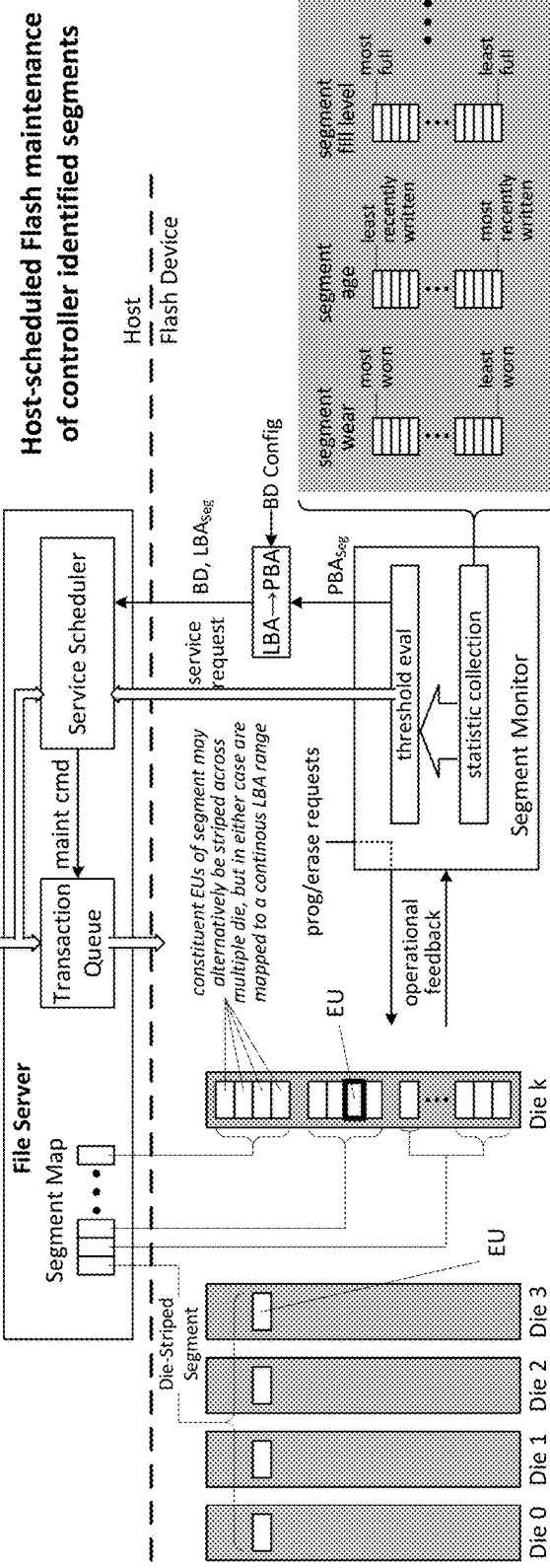
FIG. 10 Host-scheduled Flash maintenance of controller identified segments
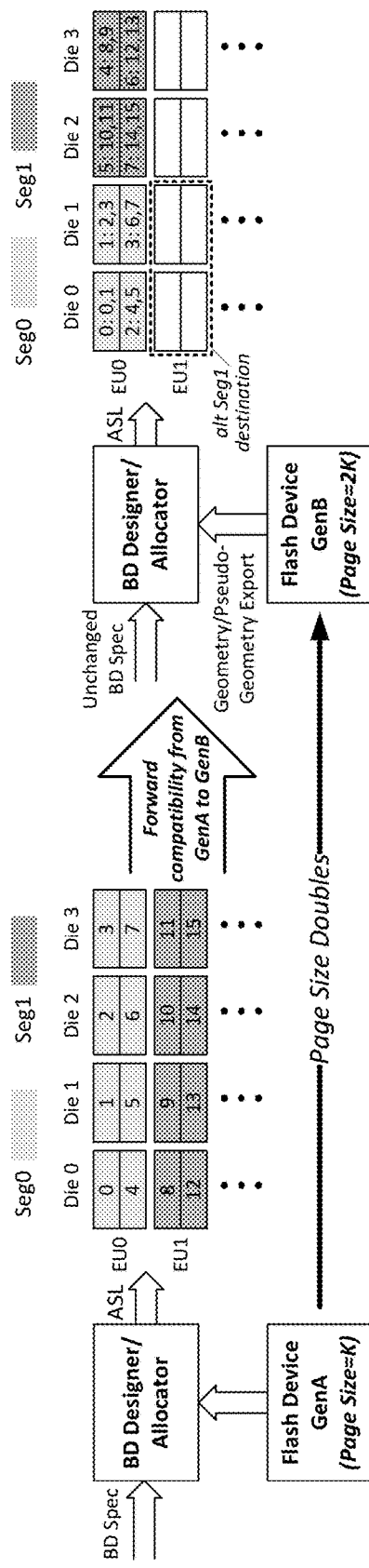
FIG. 11 Forward-compatible with drive size/feature expansion

IDEALIZED NONVOLATILE OR PERSISTENT STORAGE WITH STRUCTURE-DEPENDENT SPARE CAPACITY SWAPPING

PRIORITY/INCORPORATION BY REFERENCE

This document is a continuation of U.S. Utility patent application Ser. No. 15/690,006, filed on Aug. 29, 2017 on behalf of first-named inventor Robert Lercari for "Memory Controller with multimodal control over memory dies" (issued on May 5, 2020 as U.S. patent Ser. No. 10/642,748), which in turn claims priority to U.S. Utility patent application Ser. No. 15/074,778, filed on Mar. 18, 2016 on behalf of first-named inventor Robert Lercari for "Expositive Flash Memory Control" (issued on Oct. 10, 2017 as U.S. Pat. No. 9,785,572). U.S. Utility patent application Ser. No. 15/074,778, in turn, is a continuation of U.S. Utility patent application Ser. No. 14/880,529, filed on Oct. 12, 2015 on behalf of first-named inventor Robert Lercari for "Expositive Flash Memory Control" (issued on Jan. 10, 2017 as U.S. Pat. No. 9,542,118). U.S. Utility patent application Ser. No. 14/880,529 in turn claims the benefit of: U.S. Provisional Patent Application No. 62/199,969, filed on Jul. 31, 2015 on behalf of first-named inventor Robert Lercari for "Expositive Flash Memory Control;" U.S. Provisional Patent Application No. 62/194,172, filed on Jul. 17, 2015 on behalf of first-named inventor Robert Lercari for "Techniques for Memory Controller Configuration;" and U.S. Provisional Patent Application No. 62/063,357, filed on Oct. 13, 2014 on behalf of first-named inventor Robert Lercari for "Techniques for Memory Controller Configuration." U.S. Utility patent application Ser. No. 14/880,529 is also a continuation in-part of U.S. Utility patent application Ser. No. 14/848,273, filed on Sep. 8, 2015 on behalf of first-named inventor Andrey V. Kuzmin for "Techniques for Data Migration Based On Per-Data Metrics and Memory Degradation" (issued on May 5, 2020 as U.S. patent Ser. No. 10/642,505), which in turn claims the benefit of U.S. Provisional Patent Application No. 62/048,162, filed on Sep. 9, 2014 on behalf of first-named inventor Andrey V. Kuzmin for "Techniques for Data Migration Based On Per-Data Metrics and Memory Degradation." The foregoing patent applications are each hereby incorporated by reference, as are U.S. Patent Publication 2014/0215129, for "Cooperative Flash Memory Control," and U.S. Utility patent application Ser. No. 14/047,193, filed on Oct. 7, 2013 on behalf of first-named inventor Andrey V. Kuzmin for "Multi-Array Operation Support And Related Devices, Systems And Software" (issued on Jan. 6, 2016 as U.S. Pat. No. 9,229,854).

TECHNICAL FIELD

The disclosure herein relates to non-volatile data storage and retrieval within semiconductor memory.

BRIEF DESCRIPTION OF THE DRAWINGS

The present invention is illustrated by way of example, and not by way of limitation, in the figures of the accompanying drawings and in which like reference numerals refer to similar elements.

FIG. 4 illustrates an exemplary block device allocation and configuration within the flash device of FIG. 3 effected using the block device allocator described in reference to FIG. 2.

FIG. 5 illustrates a host perspective of the exemplary block device allocations and configurations presented in FIG. 4.

FIG. 10 demonstrates an exemplary sequence of operations coordinated between a pseudo-expositive flash memory controller and a host file server.

FIG. 11 illustrates forward (and reverse) compatibility between successive flash generations enable by a pseudo-expositive flash architecture provided by the teachings herein.

Figure 1:
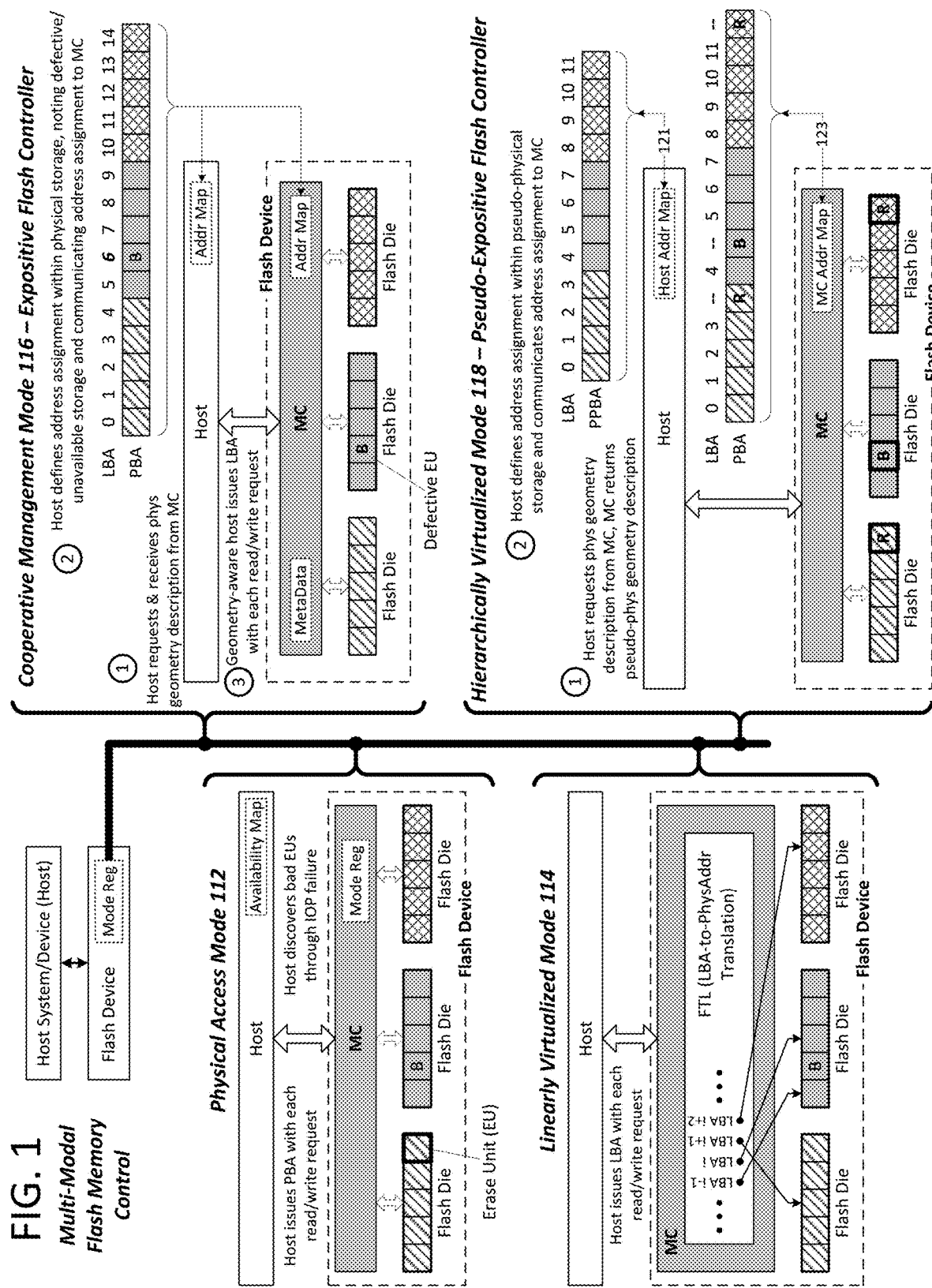
FIG. 1 illustrates an embodiment of a multi-modal flash memory device and its interconnection to a host system.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set out below exemplifies addressing schemes and supporting, methods, devices, structures and systems. Such techniques can be practiced in one embodiment by a host, in another embodiment by a memory controller (e.g., within a single drive or across multiple drives), in another embodiment by a flash memory device (e.g., die or integrated circuit) and in yet another embodiment by a host or memory controller cooperating with one or more other circuits. This disclosure also provides improved designs for a memory controller, host, memory devices, a memory system, a subsystem (such as a drive, e.g., a solid state drive or "SSD"), and associated circuitry, firmware and addressing methodology. The disclosed techniques can also be implemented in software or instructions for fabricating an integrated circuit (e.g., a circuit design file or field programmable gate array or "FPGA" configuration). While the specific examples are presented, particularly in the context of flash memory, the principles described herein may also be applied to other methods, devices and systems as well.

DETAILED DESCRIPTION

A memory controller that subdivides an incoming memory address into multiple discrete address fields corresponding to respective hierarchical groups of structural elements within a target nonvolatile semiconductor memory system and in which at least one of the discrete address fields constitutes a virtual address for the corresponding physical element within the structural hierarchy is disclosed in various embodiments. Through this hierarchical subdivision, the virtual address portion of the incoming memory address is ensured to resolve to an element within the physical bounds of a larger (hierarchically-superior) structure, but may be freely mapped to any of the constituent physical elements of that larger structure. Accordingly, a host requestor may issue logical memory addresses with address fields purposefully specified to direct read, write and maintenance operations to physically distinct structures within the memory system in a manner that limits performance-degrading conflicts while the memory controller remains free, by virtue of one or more virtualized address fields within the incoming logical addresses, to virtualize localized groups of physical structures and thus mask defective structural elements and swap operational structural elements into and out of service, for example, as they wear or otherwise require maintenance.

In other embodiments presented herein, the net storage volume of a nonvolatile semiconductor memory system is subdivided into discrete performance-isolated storage regions based on specified system requirements and underlying memory system geometry and performance characteristics, with each such storage region being mapped by an independent linear range of logical addresses. Accordingly, each performance-isolated storage region may be presented to one or more host access requestors as an independent block device (i.e., mass storage unit having a continuously mapped logical address space) so that the nonvolatile memory system may be perceived by that host as being constituted by multiple discrete block devices, each having its own performance characteristics and address space. Moreover, the mapping of the logical address space within a given block device, referred to herein as "address space layout," may vary from one block device to another (e.g., sequential addresses within logical address ranges of respective block devices may be distributed within the structural hierarchy of the memory system in different order) to yield configurable and varied block device characteristics in terms of endurance and I/O bandwidth. Further, multiple different address space layouts may be applied within different "subspaces" of a given block device (i.e., discrete portions of the block device's address range) with, for example, addresses in one subspace being sequentially applied to structural elements at different hierarchical levels of the memory system in a different order than in another subspace. Also, in a number of embodiments, system requirements specified (e.g., by a user/system designer) in terms of block device capacity and performance metrics including, without limitation, read and write bandwidth requirements and minimum data transfer size required by the block device, are automatically translated into corresponding configuration and allocation of structural elements as necessary to meet the high-level requirements, with such configuration and allocation optionally being programmed directly into the nonvolatile memory subsystem and/or corresponding block device definition reported to a host access requestor. By this approach, a system designer may configure and allocate block devices according to performance requirements of the application at hand without having to resort to the complex and error-prone task of allocating and configuring numerous physical resources within the nonvolatile memory system individually. Moreover, in a number of embodiments, high-level performance requirements specified to configure and allocate block devices within a given memory subsystem may be used to enable forward-compatible allocation and configuration of like-performance block devices within next-generation memory subsystems and thus enable seamless memory subsystem replacement (with or without data migration) and/or supplement with next-generation technologies. These and other embodiments, features and benefits are described in greater detail below in reference to exemplary drawing figures.

The nonvolatile memory subsystem in which a number of embodiments are detailed herein is presented as a flash memory device forming in whole or part a solid state disk drive (SSD); the flash memory device can be hierarchically arranged in multiple wired signaling channels each coupled to multiple flash memory dies, with each die including numerous individually erasable storage units ("erase units" or erase blocks or flash blocks) distributed in one or more access planes, and with each erase unit including numerous pages constituted by a predetermined number of single-bit or multi-bit nonvolatile storage cells (i.e., channels, dies, erase units and pages constitute, for example and without limitation, respective hierarchical physical elements within the flash memory device). For example, in one embodiment, a memory controller within the flash memory system (e.g., within the drive or SSD) subdivides each incoming "logical block address" (LBA) into respective channel, die, erase unit and page address fields, any or all of which may be virtual addresses, and resolves a commanded read or write access to a specific channel indicated by the channel address field, a specific die indicated by the die address field, a specific erase unit indicated by the erase unit field (including possible resolution to two or more erase units in the case of multi-plane command sequences) and a specific page indicated by the page address field (including possible resolution to two or more pages in the case of a multi-page operation).

Numerous specific details relating to flash memory device technology including, for example and without limitation, erase granularity limited to whole erase units (a fundamental characteristic of flash memory), usage-induced storage cell wear (i.e., as program and erase cycles involve destructive charge-carrier passage through isolating oxide layers) and finite storage cell retention times (largely due to leakage from floating storage cells which increases as feature sizes shrink in successive device generations) and disparate data write (or "program") timing and read timing constraints, bears on implementation and/or operational details of a number of embodiments presented below. In all cases, such details may change or be omitted when not required by the underlying memory technology. Thus, while the various embodiments presented herein are described in the context of flash memory devices, the structures and techniques disclosed are not so limited and may be applied with respect to any underlying memory technology wherever beneficial including both nonvolatile and volatile memory technologies.

FIG. 1 illustrates an embodiment of a multi-modal flash memory device ("flash device") and its interconnection to a host system or device, referred to herein as the "host." As shown, the flash device includes multiple flash memory dies coupled to a multi-modal flash memory controller (MC). It should be understood that the memory controller is depicted in multiple locations within the figure, to illustrate different modes of operation; the memory controller itself includes a mode register or other configuration circuit which, when programmed by the host or pre-programmed during or after flash device production, enables the flash device to be selectively operated in any one of at least four different memory control modes including a physical access mode 112, a linearly virtualized mode 114, a cooperative management mode 116, and a hierarchically virtualized mode 118.

In physical access mode, shown generally at 112, the flash device takes little or no autonomous action and instead merely executes read, write and erase requests at the direction of the host. Thus, the host is fully aware of the underlying flash device geometry (shown, in this conceptual example, as three flash memory dies each having five erase units) and issues a physical block address (PBA) with each read/write request—that is a memory address having a fixed, one-for-one correspondence to a logical storage block (e.g., smallest addressable unit of data storage) within the collective storage space formed by the constituent flash dies of the flash device. An address received by the memory controller from the host is substantially identical to the address transmitted from the memory controller to memory; that is, the physical access mode enables executions of flash memory input/output operations (IOPs) with theoretically minimal latency (i.e., no address translation is needed and the host can schedule IOPs in a manner that avoids resource conflicts due to full awareness of the underlying physical hardware and limitations thereof). In this mode, however, the host is burdened with numerous complex and hardware-specific media management tasks, including discovery and avoidance of failed structural elements (especially erase units and dies), leveling otherwise disparate wear between different erase units ("wear leveling"), reducing storage fragmentation ("garbage collection") as the ratio of partially filled erase units to available continuous storage space rises, and refreshing (i.e., re-writing in a new location) data nearing its retention time limit ("scrubbing" aged data). Thus design and implementation of a host system needed to interact with and manage the flash memory in physical access mode can become tremendously complex and, making matters worse, may require substantial and expensive re-design as new generations of flash memory devices become available.

Still referring to FIG. 1, if physical access mode represents an extreme burdening of the host in return for potentially minimized IOP latency, the linearly virtualized mode shown at 114 represents the opposite extreme. In linearly virtualized mode, a flash translation layer (FTL) and media management engine are enabled within the memory controller to present the aggregate storage of the flash device (i.e., collective storage area within the three flash memory dies) to the host as a simple linear address range in which all media management operations are executed transparently (i.e., without host visibility or responsibility). While the FTL and under-hood media management tremendously simplifies host design and implementation, the cost of that simplicity is a substantial degradation of flash device performance and capacity. For example, because every logical block address issued by the host (e.g., LBA i−1, LBA i, LBA i+1, LBA i+2 as shown in FIG. 1) may map to any storage location within the flash device (e.g., any page within any erase unit within any die on any signaling channel within the flash device), translation time tends to be substantial and increases exponentially as flash capacity grows (i.e., in new generations of flash devices). Worse, because the mapping of logical block addresses to underlying storage locations is invisible to the host, the host is unable to avoid sequential issuance of logical block addresses that resolve to the same flash die, meaning that resource conflicts may arise at random. From the host perspective, the I/O latency (i.e., time required to complete an I/O) is simply unpredictable and may, at any instant, grow many times beyond the native operational time imposed by the underlying flash die hardware. This unpredictable latency is made even worse by the memory controller's autonomous scheduling of flash maintenance operations (i.e., garbage collection, wear-leveling, data scrubbing) each of which tends to involve numerous memory-controller-initiated write operations followed by one or more relatively slow erase operations and thus may dramatically increase the I/O latency perceived by the host.

Continuing with the linearly virtualized controller mode 114, the memory controller's responsibility for flash maintenance requires that it keep substantial storage regions in reserve. Even more space is typically reserved to reduce the probability of worst-case resource conflict scenarios (i.e., limit occurrence of system-buckling long-latency I/O events). As a result, the overall flash memory capacity made available to the host in linearly-virtualized mode (i.e., the space encompassed by the linear LBA range) is generally substantially less than the physical capacity of the device. This "overprovisioning" of the physical storage space to meet a host-desired capacity and performance is exacerbated by the need for nonvolatile storage of the ever-growing FTL translation table (i.e., growing as the flash device capacity is consumed, and growing with new generations of more capacious flash devices) within the nonvolatile flash storage itself.

Still referring to FIG. 1, the cooperative management mode shown at 116 achieves the performance advantages of physical access mode by exposing the underlying flash geometry to the host, but limits the host's flash management burden by gathering statistics needed to manage flash maintenance operations and by notifying the host when maintenance is required. The general approach is enumerated in the detail view of cooperative management mode and in which the host (1) requests and receives a physical geometry description from the memory controller (referred to herein as a "geometry export") and then (2) defines an address assignment in which the linear block address range of the host file system is mapped directly onto the physical block address within the underlying flash storage. In the particular example shown, a defective and unavailable erase unit marked by 'B' is reported to the host by the memory controller and noted within the LBA-to-PBA address map.

Hierarchically virtualized mode, shown for example at 118, takes cooperative management mode a significant step forward by presenting to the host an idealized view of underlying physical structures within the flash memory device. That is, as in cooperative management mode, the host requests a physical geometry description from the memory controller, but the memory controller returns, instead of a true physical description with all attendant details regarding defective storage and other realities, an idealized or pseudo-physical description of the underlying geometry that enables abstraction of the underlying flash memory structures without loss of coherence with respect to boundaries between hierarchical structures. Thus, in the hierarchically-virtualized example shown, the memory controller informs the host that the aggregate flash storage is subdivided among three flash dies and that four erase units are available within each flash die, holding in reserve some number of erase units (or dies or any other resource likely to fail over time) as necessary to maintain a static idealized perspective of the underlying flash geometry for the host. Accordingly, despite the defective erase unit ('B') within the center flash die or even run-time detected failure of erase units within the other two flash dies, the host perceives a defect free set of physically extant dies and erase units therein. This pseudo-physical host perspective may be appreciated by comparing the host-perceived flash device architecture (three defect-free dies, each having four erase units) shown by the LBA to pseudo-physical block address (PPBA) mapping at 121 with the memory controller mapping of the LBAs to underlying physical block addresses (PBAs) as shown at 123. Whereas the host perceives a linear address mapping to the idealized physical storage (i.e., pseudo-physical storage), the memory controller maps the LBAs discontiguously, skipping over reserved and defective erase units, and thus virtualizing the pool of erase units within each individual flash die while maintaining the physical boundary between dies as reported to the host. Contrasting the cooperative management and hierarchically virtualized operating modes shown in FIG. 1, the controller fully exposes the physical flash hardware in the cooperative management mode and exposes a pseudo-physical hardware set in the hierarchically virtualized mode and is thus referred to herein alternately as an expositive or pseudo-expositive memory controller when operating in those respective modes, with the pseudo-expositive memory controller being a specialized instance of the more general expositive memory controller.

Note that in the cooperative management mode 116 and the hierarchically virtualized mode 118, some limited amount of address translation can be performed at the memory controller, e.g., by translating the address of one block in the hierarchy (e.g., erase unit) while preserving logical location level at other address levels (e.g., preserving page ordering within a remapped erase unit); in the cooperative management mode 116, such remapping can be temporary (e.g., with the host ultimately being informed for example of bad block remappings, for example), and in the hierarchically virtualized mode 118, such remapping can be transparent, with a memory controller deriving for example, any of erase unit, page, die, plane, device, channel or other hierarchical address distinctions while preserving address-space division (e.g., logical order) at other levels. Among other advantages, this architecture provides for greatly simplified address translation (e.g., which can optionally be implemented entirely in hardware), and facilitates configurable and predictable I/O latency, and greatly shortens address translation time and associated complexity.

Figure 2:
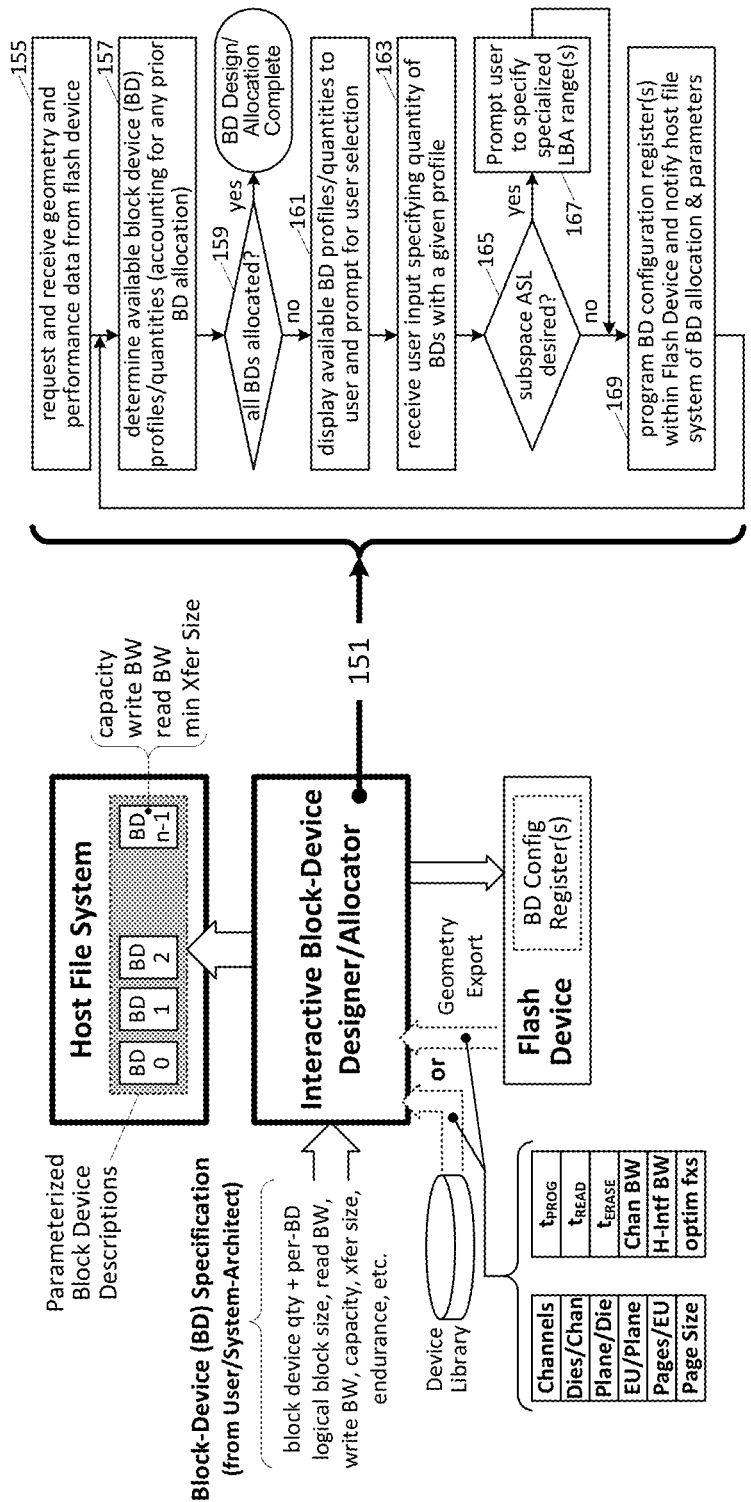
FIG. 2 illustrates an exemplary application and configuration of a flash device having a pseudo-expositive memory controller within a host system.

FIG. 2 illustrates an exemplary application and configuration of a flash device having a pseudo-expositive memory controller (i.e., multi-mode memory controller operating in a pseudo-expositive mode, or memory controller having only a pseudo-expositive operating mode) within a host system. In the particular embodiment shown, an interactive block-device designer/allocator is executed within either the flash device, host system and/or separate computing device to obtain flash device geometry and performance characteristics and interact with a system designer (i.e., user, system architect or other human operator or programmed intelligence) to define and allocate one or more discrete performance-isolated storage regions within the flash device. The block device designer/allocator ("block device allocator" for short) supplies parameterized descriptions of each allocated flash storage region to a host file system (i.e., one or more threads or processes executed on a host computing system to carry out file storage, retrieval and maintenance operations with respect to files and other data objects) which, accordingly perceives each such flash storage region as a linear range of logical block addresses and thus as an independent block device.

Still referring to FIG. 2, and more specifically to the exemplary operational flow at 151, the block device allocator initially requests and receives geometry and performance data from the flash device and/or a device library at 155. In the embodiment shown and a number of embodiments described below, the geometry information includes hierarchical topology information including, for example and without limitation, (1) the number of independent flash-die access channels (also referred to herein as "signaling channels" or simply "channels") coupled to or otherwise accessible by the memory controller, (2) the number of discrete flash dies coupled to each access channel, (3) the number of erase-unit planes (or "planes" for short) within each flash die, (4) the number of erase units within each plane, (5) the number of pages per erase unit and (6) the storage capacity of each page. In general, each of the device geometry parameters may be a physical (i.e., actual) or pseudo-physical representation of the corresponding underlying hierarchical structure (e.g., channels, dies, planes, erase units or pages). Performance data, which may be viewed as part of the geometry export, may include for example and without limitation, (a) the nominal programming time of a physical page within the erase unit of a flash die (i.e., "$t_{PROG}$" also referred to herein as the page write time), (b) the nominal read time of the physical page ($t_{READ}$), (c) the nominal time required to erase contents within an erase unit ($t_{ERASE}$), (d) the data transfer bandwidth over an individual access channel (Chan BW), (e) the data transfer bandwidth of the host interface (H-Intf BW), (f) various performance enhancement/optimization functions that may be available (e.g., multi-page functionality, read caching, write caching, etc.), and so forth.

At 157, the block device allocator determines the available block device profiles (i.e., physical and performance characteristics of different configurations of physical resources within the flash device) accounting for any pre-existing allocations. Assuming that no block devices have been allocated at this point and thus that resources sufficient for further block device definition remain within the flash device (i.e., negative determination at decision 159), then the block device allocator displays (e.g., in a visible display or other user interface of the computing device in which the block device allocator is instantiated) available block device profiles and the allocable quantities of each as shown at 161, prompting the user/designer to select one or more block device profiles and their desired allocation quantities. Upon receiving user input specifying a quantity of block devices having a given profile (and possibly multiple different profiles and respective quantities) at 163, the block device allocator prompts the user/designer to specify, for each block device to be allocated, whether the LBA range of the block device is to be uniformly sequenced among the hierarchical structures of the flash storage region to be allocated (e.g., channels, dies, erase units, pages) thus establishing a uniform address space layout (ASL) for the block device, or whether the address space layout is to be varied within one or more "subspaces" of the block device (i.e., "sub-ranges" of the overall LBA range for the block device). If subspace ASL is desired (affirmative determination at 165), the user is prompted to specify one or more specialized LBA ranges (i.e., LBA ranges having ASLs different from the otherwise uniform ASL corresponding to the block device profile). After receiving subspace ASL specifications, if any, for each user-requested block device, the block device allocator programs block device configuration registers 169 within the flash device (thereby allocating individually configured block devices within the flash device) and notifies the host file system of the block device allocation, supplying, for example a parameterized description of each block device that informs the host file system of the block device capacity (thus establishing the LBA range of the block device for a given LBA granularity), write bandwidth, read bandwidth and minimum data transfer size.

Note that the LBA granularity (i.e., size of a logical block of data—not to be confused with a block device which will typically hold millions of logical blocks of data each having a respective LBA) may be programmed within the block device configuration registers or other configuration storage of the flash device to enable a variable user-specified number of LBAs to span each physical page of storage within the flash device. Similarly, as discussed in greater detail below, the size of a logical quantum of data, referred to herein as a "host data segment" or "segment" and that constitutes a fundamental unit of storage allocation operated upon by the host file system, may be programmed within the block device configuration register to enable the memory controller to associate discrete sets of physical storage structures (e.g., an integer number of erase units within a given block device) with respective segments and thereby facilitate coordinated file-system and flash device management operations.

Continuing with the block device allocator flow, after programming the block device configuration registers and exporting corresponding block device parameters to the host file system at 169, the block device allocator returns to the space availability evaluation at 157, and determines the block device profiles and quantities thereof that remain available for allocation after accounting for any prior allocations at 169. If all available block devices are determined to have been allocated (i.e., all resources reported to be available by the flash memory device and/or library description of the flash memory device have been allocated in a block device definition or respective block device definitions), then the block device design/allocation operation is deemed complete and the block device allocator terminates. Though not specifically shown, the designer/user of the block device allocator may also terminate the block device allocation sequence without allocating all flash resources.

Reflecting on the block device allocation sequence shown in FIG. 2, it should be noted that numerous additional provisions and or options may be implemented in various embodiments. For example, instead of executing the flash memory/file system configuration operation at 169 in each loop iteration, the block device allocator may accumulate an internal set of flash device and flash memory configuration parameters in each loop iteration, prompting the user/designer to review a comprehensive allocation plan before proceeding with flash device programming and/or file system notification. Also, instead of issuing configuration commands/parameters to the flash memory device and/or host file system, the block device allocator may write configuration information to one or more configuration files (or other data objects) for later delivery to actual flash memory devices or host file systems. Further, instead of iteratively prompting a user to select from among available block device profiles (which selection constitutes an implied or explicit user/designer specification of block device characteristics, including logical block size, read bandwidth, write bandwidth, capacity, transfer size, endurance metric, etc.), the block device allocator may initially receive desired block device performance parameters from a user/designer and thus proceed from the user's initial performance specification to resolve block device allocations. In yet other embodiments, the quantity of block devices and/or their individual characteristics may be determined in whole or part by user/designer specification of aggregate read or write bandwidth within the flash device as a whole (together with other "overall device" requirements, such as a minimum segment size, logical block size and/or transfer size), with the block device allocator allocating and configuring, for example, a minimum or maximum number of block devices as necessary to meet those aggregate requirements. Accordingly, the iterative block device allocation sequence shown in FIG. 2 should be understood as but one of many possible block device allocation schemes which may be deployed in different embodiments or configurations.

Figure 3:
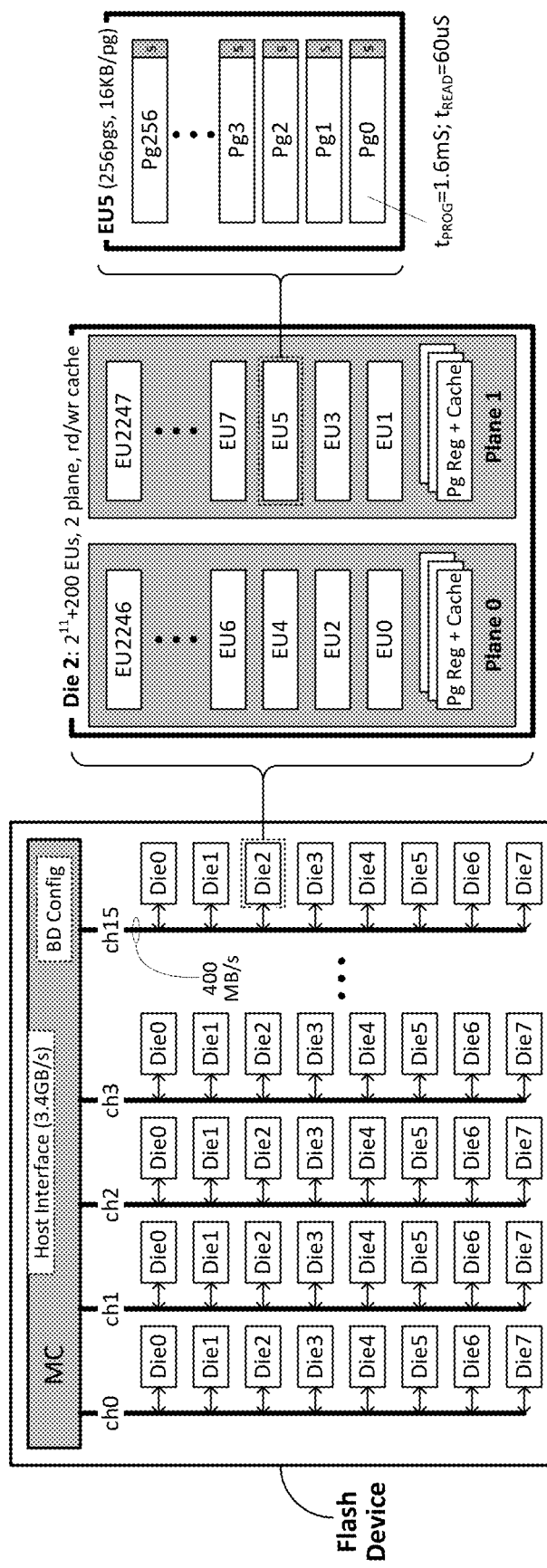
FIG. 3 illustrates an exemplary flash memory device in which discrete block devices may be configured and allocated as described in FIG. 2.

FIG. 3 illustrates an exemplary flash memory device in which discrete block devices may be configured and allocated as described in FIG. 2. For purposes of explanation and understanding only, a specific flash device geometry and set of performance metrics are shown in FIG. 3 and carried forward in a number of embodiments described in reference to following figures of the drawing. In all such cases, the specific geometries (e.g., numbers of physical elements at each hierarchy within the flash device structure including, without limitation, access channels, flash dies per channel, planes per flash die, erase units per plane, pages per erase unit, page size, page read and write times ($t_{READ}$ and $t_{PROG}$), channel bandwidth and host interface bandwidth, number of host interfaces, etc.) may be different from those shown in FIG. 3.

With that understanding, it can be seen that the exemplary flash device in FIG. 3 includes a memory controller coupled to 16 access channels (ch0 . . . ch16), with each access channel coupled to eight flash dies, each flash die having two planes, and each plane containing 1124 erase units (2248 erase units per die), and each erase unit containing 256 pages each containing a number of flash memory cells (e.g., NAND memory cells, though NOR or flash memory cell configurations may be deployed in alternative embodiments) sufficient to store 16 kilobytes (kB) of data. As an aside, references to volumes of data herein are generally intended to mean a power of two quantity so that KB, MB, GB, TB, etc. refer respectively to $2^{10}$, $2^{20}$, $2^{30}$, $2^{40}$, etc. byte of data (sometimes designated by KiB, MiB, GiB, TiB and so forth).

Continuing with the flash memory embodiment shown in FIG. 3, for purposes of example, it is assumed that the geometry exported to the block device allocator accurately reflects the underlying structural/physical hierarchy in all aspects but one—that the number of erase units per plane is reported pseudo-physically as 1024 (i.e., $2^{10}$ and thus $2^{11}$ or 2048 erase units per die) instead of 1124, meaning that 100 erase units per plane and thus 200 erase units per die are held in reserve. As explained below, this erase unit reservation or "spare pool" enables the memory controller to virtualize the available erase units within each die and thus mask defective erase units from host visibility and swap erase units into and out of service as storage for respective LBA ranges of an allocated block device without impacting the host perspective of the block device or the flash device as a whole. Also, it bears emphasis that each virtualized collection of erase units is confined to the individual flash die (or even the individual planes, depending on block device configuration) containing the corresponding physical erase units. That is, while a given LBA that resolves to a flash die may include a virtualized erase-unit address field (an example of a discrete address field within the LBA corresponding to a group of physical elements within a structural hierarchy—erase units in this case), the LBA is nonetheless guaranteed by design to resolve to a physical erase unit with the LBA-specified physical die on the LBA-specified physical channel. More generally, as discussed in greater detail below, while any address fields (i.e., contiguous or discontiguous ranges of bits within an incoming LBA) corresponding to a hierarchical group of structures (e.g., channels, dies, erase units, pages) may be virtualized such that one or more of the corresponding hierarchical structures may be held in reserve, the address-space division between the hierarchical structures is maintained. Thus, once the channel field of an LBA is resolved to a particular channel, it is assured that, despite possible virtualization of the sub-hierarchical fields (i.e., die field, erase unit field and/or page field within the LBA), the LBA will ultimately resolve to a physical page on a physical die on that particular channel. This principle holds true for each level of the structural hierarchy so that once the LBA is resolved to a particular die, it is assured that the remaining erase unit and page fields, even if one or both are virtualized, will resolve to a physical page within that die, and likewise an LBA resolved to a particular erase unit is assured to specify a physical page within that erase unit, despite possible virtualization of the LBA's page field. Through this arrangement, it becomes possible to virtualize physical structures at each hierarchical level within the flash device while guaranteeing access to discrete subdivisions of the flash storage and thereby permitting, for example, specification of discrete subsets of dies and channels (or even finer-grained hierarchical elements where it makes sense to do so) to respective block devices specified within the block device configuration storage.

FIG. 4 illustrates an exemplary (and not necessarily complete) block device allocation and configuration within the flash device of FIG. 3 effected, for example, using the block device allocator described in reference to FIG. 2. As shown, five block devices, BD0-BD4, are allocated, with each block device being constituted by one or more flash dies that are collectively associated with one or more memory channels (i.e., in this example, the smallest allocable block device is a single flash device). The block device configuration storage (BD Config) includes a block device lookup table (BD LUT) that is indexed by a block device identifier (BDid which may be, for example, a namespace or other handle or identifier) and holds, for example and without limitation, a specification of the one or more channels spanned by the block device (i.e., "constituent channels") and the one or more dies on the constituent channels. For instance, block device 0 (BD0) spans channels 0 and 1, and includes dies 0 and 1 on the constituent channels and thus includes four flash dies in all. Block device 1 is similarly defined as encompassing a 2×2 set of flash dies, but spans channels 2 and 3 instead of 0 and 1 and thus forms an entirely discrete storage area (i.e., no physical overlap) with respect to block device 0. Block device 2 spans a single channel (channel 0) and flash dies 2-5 on that channel, and thus also constitutes a four-die block device, but without the channel parallelism of block devices 0 and 1 (i.e., a 1×4 block device instead of a 2×2 block device). Block device 3 is also a four-die 1×4 block device, but is constituted by allocation of dies 2-5 on channel 1 instead of channel 0. Lastly, block device 4 is a 16-die block device that includes a single die (die 6) all 16 channels—that is, a 16×1 block device. Thus, of the overall set of five allocated block devices, four block devices (BD0-BD3) include discrete sets of four constituent dies and thus have a 32 GB pseudo-physical storage capacity (i.e., each die includes a pseudo physical count of 2048 erase units, each containing 256 16 KB pages and thus $2^{11}*2^8*2^{14}$ bytes or 8 GB) and the fifth block device (BD4) includes a discrete set of sixteen dies and thus a 128 GB pseudo physical storage capacity. Also, in this particular example, the channel and die identifiers recorded within the block device lookup table correspond one-for-one with underlying physical channels and dies within the flash device as neither of those elements of the structural hierarchy are virtualized. In alternative embodiments or configurations of the flash device, either or both of those elements may be virtualized.

Continuing with FIG. 4, each entry within the block device lookup table additionally includes an index to a respective set of one or more entries within an ASL lookup table (ASL LUT), with each ASL lookup table entry including ASL (address space layout) parameterizations and feature control settings for the complete or partial LBA range of the corresponding block device. In the particular example shown, ASL/feature-control parameter settings for three different block devices are illustrated, including a uniform ASL/feature-control parameterization within block device 0 (i.e., parameterization applies uniformly to the entire LBA range of the block device—there are no subspace definitions), another uniform ASL/feature-control parameterization with block device 2, and another multi-subspace ASL/feature-control parameterization within block device 4, with separate ASLs defined for each of multiple LBA ranges within the block device, only two of which are shown. Entries for block devices 1 and 3 are also present in the ASL lookup table, but not specifically shown in FIG. 4.

As discussed above, the ASL parameters define the manner in which sequential LBAs are distributed within the structural hierarchy of the block device and thus indicate the number of pages within the same erase unit (i.e., "seqPg") to which sequential LBAs apply before progressing to page(s) in the next erase unit, and then the number of erase units to be sequentially accessed within a given die ("seqEU") before progressing to the next die, and then the number of dies to be accessed on a given channel ("seqDie") before progressing to the next channel. The feature control parameters include, for example and without limitation, whether read caching and write caching are to be enabled (independently settable via the rdC and wrC fields of the ASL lookup table entry) for the block device or subspace thereof, the number of pages that may be simultaneously or concurrently written to or read from within the same erase unit (nPa), and the number of erase-unit planes to be concurrently accessed in a given write or read command sequence (nPl). In general, read caching is a double-buffering construct that enables data retrieved from an address-selected storage page and stored within the flash die's page register (i.e., a buffer element that temporarily holds outbound page-read data and inbound page-write data) to be output from the flash die concurrently with transfer of subsequently selected storage-page data to the page register, and write caching is a similar double-buffering arrangement that enables concurrency during page-write operations. Thus, the read and write page caching features, when enabled, reduce net latency of a sequence of read or write operations, respectively. In general, page caching scales (e.g., multiples according to cache depth) the effective size of the page register and thus correspondingly raises the minimum data transfer size imposed on the host in a given page read or write operation. For simplicity of understanding, page caching in both the read and write directions is disabled (i.e., "off") within the exemplary ASL lookup table entries shown. Multi-page operation (i.e., nPA set to a value greater than one) and multi-plane operation (nPl set to a value greater than 1) likewise raise the minimum data transfer size between the host and memory controller. In the specific examples shown in the ASL lookup table of FIG. 4, multi-page operation is disabled at least within block devices 0, 2 and 4, and multi-plane operation is disabled at least within block devices 2 and 4. By contrast, dual-plane operation (nPl=2) is specified for block device 0, thus doubling the number of concurrently written pages (a block device characteristic referred to herein as a "stripe size" or "frontier width") as compared to a physically-comparable block device (e.g., block device 1) configured for single-plane operation.

Still referring to FIG. 4, the singular values ('1') recorded for the LBA-sequencing ASL parameters within the ASL lookup table entry for block device 0 dictate that LBAs are to be distributed widely through the structural hierarchy of the flash device with, for example, each page of a sequentially addressed set of four pages (and thus a sequential range of 16 LBAs given the sLB=4 KB logical block size setting) being read or written within a different one of the four constituent dies of the block device, thus effecting 4× ("multiplied-by-four") parallelism in the page read or write operation and thus approximately a 4× bandwidth increase over a configuration that directs four sequential page read or write accesses to the same erase unit within a given die. In actuality, the dual plane setting within block device 0 doubles the number of concurrently accessed pages within each of the four constituent flash memory dies of block device 0, thus establishing an 8-page stripe size and thus read and write bandwidths that are approximately eight times the baseline single page read and write bandwidths of a given flash die. By contrast, block device 1 which otherwise constitutes the same 2×2 die-layout as block device 0, is configured with a deep (rather than wide) address space layout and with only single-plane access throughout its LBA range. Thus, pages falling within a sequential LBA range of block device 1 are mapped to physical pages within an erase unit until the end of that erase unit is reached (i.e., "Pg/EU"), with the LBA range thereafter continuing through the physical pages of a next erase unit and then the next until the final erase unit (EU/Die) within the die has been traversed, with the LBA range thereafter continuing through the pages and erase units of the next die on the same channel before carrying over to EUs and dies on an adjacent channel. In general because the stripe size is very narrow (i.e., a single page and thus as narrow as possible in the exemplary flash memory die shown), only a single erase unit is impacted by each page write operation and thus, despite the relatively low write bandwidth (i.e., 16 KB/$t_{PROG}$ in contrast to the 8*16 KB/$t_{PROG}$ bandwidth achieved by the 8× wider stripe size in block device 0), write-induced wear resulting from, for example, storage of a 16 MB host segment, will occur in only a relatively small number of erase units and dies—four 4 MB erase units within the same die in this example—in contrast to the storage of each of the 1024 16 KB pages within a respective one of the 1024 erase units of block device 0 (i.e., each of the 256 erase units within each of the four dies is written to and thus worn to some degree). Conceptually, while the total page wear is equivalent in both block die configurations (the same number of pages is written), the wear within narrower-stripe-size (i.e., deeper, but lower bandwidth) block device 1 is concentrated within a much smaller number dies (and potentially erase units as well), simplifying wear-leveling operations and thus raising endurance of the block device as compared to wider, higher-bandwidth block device 0. In general, all these considerations are made available to the user/system designer in configuring the block devices, as the designer is able to directly, or with the aid of the block device allocator, specify ASL and feature-control parameters that strike a design balance between endurance and bandwidth requirements of a given application, potentially configuring block devices having widely varying performance characteristics within the same flash memory device, as illustrated by block devices 0-4 in FIG. 4.

Concluding with FIG. 4, the ASL lookup table includes multiple entries (and thus multiple subspace definitions) for block device 4, with an initial entry specifying a 4K LBA range (0-4095) mapped for high I/O bandwidth (i.e., 16-page stripe size as the write frontier spans all sixteen of the flash dies within the block device) and another entry specifying a subsequent 4K LBA range mapped for endurance (single-page stripe size). One or more other subspace definitions (not shown) complete the LBA range mapping of block device 4.

FIG. 5 illustrates a host perspective of the exemplary block device allocations and configurations presented in FIG. 4, showing relative block device capacities by the area/footprint of the block devices (as will be the case within the physical flash storage media) and illustrating relative block device bandwidths according to block device width (left-to-right across the drawing figure). Thus, block devices 0-3 all have the same four-die, 32 GB capacity and thus have the same footprint (i.e., spanning an equivalent area within the figure), while block device 4, encompassing four times as many flash dies as each of the other block devices has a correspondingly larger 128 GB capacity. Also, block devices 0, 1, 2, 3 and 4 are depicted with respective widths according to their nominal maximum I/O bandwidths of 8×, 1×, 1×, 2× and 16×, respectively, where each non-unity multiplier scales the baseline read and write bandwidths (i.e., 1/$t_{READ}$ and 1/$t_{PROG}$). As shown in detail view 251, the signaling bandwidth of block device 4 varies according to subspace, having a high (16×) bandwidth in the initial LBA range, and a 1× bandwidth in the LBA range that follows (i.e., in accordance with the respective subspace stripe sizes of 256 KB and 16 KB). Note also that actual block device bandwidths may be constrained by peak channel and/or host interface signaling rates, particularly in the case of memory read operations. For example, because the host interface is shared between all block devices (at least in the single host-interface embodiment shown in FIGS. 3 and 4) and individual access channels may be shared by as many as eight block devices (or more or fewer according to the number of flash dies per channel), operations executed in one block device may cut into the signaling bandwidth needed for peak-rate operation within another block device, particularly where numerous high-bandwidth block devices share the same signaling access channel or a large number of block devices are allocated within the flash device (which may saturate the host interface during occasional concurrent read access within a threshold number of block devices).

FIG. 5 also presents a non-exhaustive list of flash device performance characteristics and features enabled by hierarchical address virtualization within the memory controller and configurable block device allocation, including (i) a configurable and predictable I/O latency, (ii) brief or otherwise negligible logical-to-physical ("L2P") address translation time (or at least dramatically reduced L2P time relative to operating modes that invoke a flash translation layer), (iii) allocation of discrete defect-free block devices in user-specified quantities and capacities, (iv) host-scheduled maintenance of flash-device-identified segments (or other logical units of storage), and (v) forward compatibility/ease of migration as flash device capacities and feature sets expand in successive device generations. Each of these characteristics/features is discussed in greater detail below.

Figure 6:
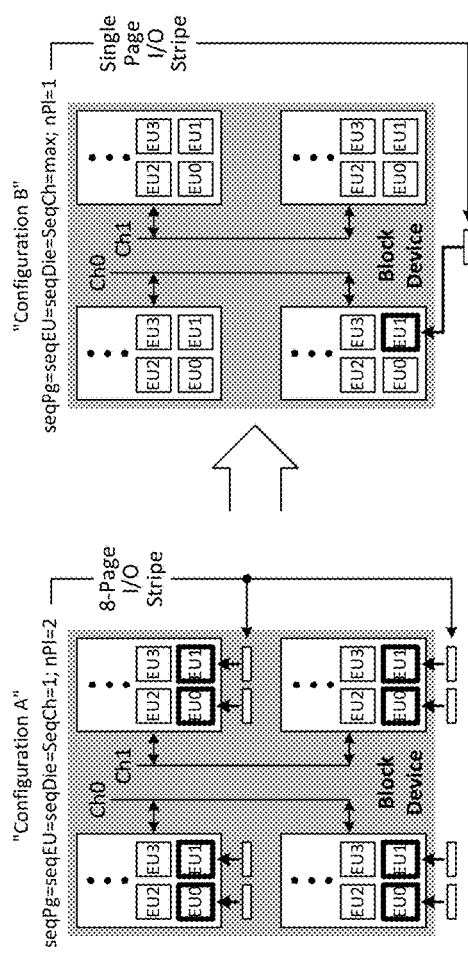
FIG. 6 illustrates an exemplary pair of block device configurations.

FIG. 6 illustrates an exemplary pair of block device configurations that demonstrate the configurable and predictable I/O latency enabled by the pseudo-expositive flash device described above (i.e., flash device having a pseudo-expositive memory controller) and the user-configurable block device allocation therein. These configurations will be respectively referred to as "configuration A" and "configuration B," with it being understood that a device may be reconfigured dynamically or otherwise as desired, as indicated by the presence of a migration arrow separating these two configurations. As shown, each of the block configurations features a 2×2 disposition of four dies (i.e., two dies coupled to channel 0 and two dies coupled to channel 1) and two planes of erase units within each die. That is, the block device configurations represent physically identical geometry and capability. However, by programming a wide and shallow ASL (i.e., ASL parameters set to distribute sequential LBAs through a minimum number of physical structures at each level of the structural hierarchy) and enabling dual-plane operation, an 8-page I/O stripe width is implemented with block configuration A and thus an 8 page/$t_{PROG}$ write bandwidth and 8 page/$t_{READ}$ read bandwidth, assuming sufficient overhead within the host-interface and flash-die access channels (as indicated by the 8 EU's in bold in the left-most grouping of 4 dies in FIG. 6). By contrast, block device configuration B features a narrow and deep ASL (i.e., ASL parameters set to distribute sequential LBAs through a maximum number of physical (or pseudo-physical) structures at each level of the structural hierarchy) and for single-plane operation, so that a single-page stripe size is established and thus write and read bandwidths of only 1 page/$t_{PROG}$ and 1 page/$t_{READ}$, respectively. As explained above, the sequencing of LBAs through all the physical (or pseudo-physical) structures of a given die before proceeding to the next die increases endurance of the block device relative to its wider-stripe-width counterpart. Accordingly, the ASL of a given block device within the pseudo-expositive flash device may be tuned to meet endurance and bandwidth targets of a given application.

Figure 7:
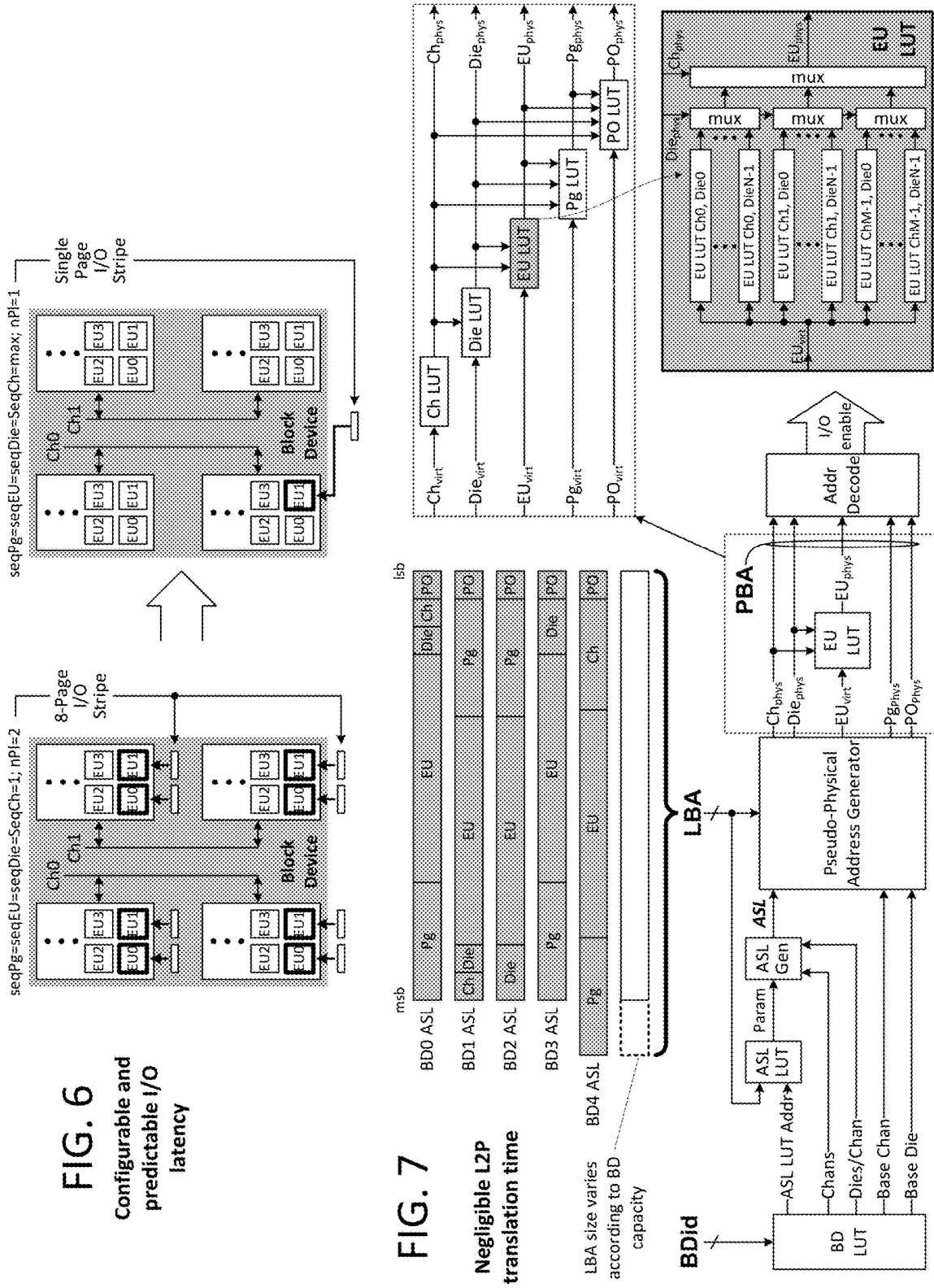
FIG. 7 illustrates exemplary generation of a physical block address in response to an incoming LBA.

FIG. 7 illustrates an exemplary generation of a physical block address in response to an incoming LBA (i.e., logical block address provided by host in connection/association with a memory access or maintenance operation) and block device ID (BDid). As shown, the block device ID is applied to a block device lookup table (e.g., as described in reference to FIG. 4) to retrieve information identifying the channels and dies that constitute the block device (i.e., allocated to the block device) and thus, base die and base channel values that specify starting boundaries within a physical or pseudo-physical die matrix, together with parameters that indicate a number of channels and dies per channel spanned by the block device (Chans, Dies/Chan). In other embodiments, the constituent dies and channels of the block device may be specified in other ways (e.g., list of specifically identifiable dies, starting channel/ending channel together with starting die/ending die, etc.).

In the implementation shown, the block device lookup table also outputs an ASL lookup address to the ASL lookup table. The ASL lookup table, in turn, outputs the recorded ASL parameters (including logical block size if implemented as a variable parameter) to an ASL generation logic block which in turn outputs an address-space-layout value that enables the incoming LBA to be decomposed into a set of hierarchical "sub-address" values, one sub-address for the group of elements at each respective level of the structural hierarchy within the flash device (e.g., channel sub-address, die sub-address, erase-unit sub-address, page sub-address).

This LBA decomposition into sub-addresses is easiest understood by considering the special case in which each sub-address maps to a power-of-two number of corresponding hierarchical elements (e.g., $2^4$ channels, $2^3$ dies per channel, $2^{11}$ erase units per die, $2^8$ pages per erase unit) as, in that case, the ASL indicates, in effect, the location of discrete bit fields within the incoming LBA that correspond to respective levels of the structural hierarchy. Moreover, as shown in the shaded examples of ASLs for block devices 0-4 (BD0-BD4) at, the ASL also identifies the position of each discrete bit field within the ASL—a consequence of the sequential LBA assignment parameters described above in reference to FIGS. 4 and 5. Considering the ASL for block device 0, for example, it can be seen that, except for the page offset fixed at the lowest bits of the incoming LBA, the channel sub-address field constitutes the least significant field of the BD0 ASL, followed by the die sub-address field, the erase-unit sub-address field and then the page-address sub-address field. Accordingly, assuming for example that the page offset is a two-bit field such that four logical blocks are stored within each flash page, then every fourth LBA in a linear sequence of LBAs will be written within a die on a different channel with modulo wrap around to an initial channel after a die on the final channel has been written. By contrast, the sub-address (or field) order in the block 1 ASL is exactly the opposite that of block device 0 (excepting the least-significant page offset field), such that pages are sequenced first, then erase-units, then dies, and then channels at the end.

Continuing with FIG. 7, as the ASL indicates how the individual hierarchical sub-address fields have been packed or encoded within the incoming logical block address, that value is supplied to pseudo-physical address generator and used therein to extract (or unpack or decode) or otherwise recover the individual hierarchical sub-addresses. In the particular example shown, the erase-unit sub-address (EU-virt) is assumed to be a virtual address (e.g., resolving between 2048 possible erase units within a die having, in actuality, some larger number of erase units) which is therefore supplied to a sub-address translation table (or lookup table) for un-mapping to the physical address of the erase unit to be accessed. In the particular example shown, the remaining sub-address fields are assumed to be physical addresses corresponding to respective levels of the structural hierarchy so that those sub-address fields, together with the output of the translated erase-unit address (EUphys) constitute a physical block address that may be supplied to address decoding logic to issue the necessary control and enable signals to effect access to the specified page of flash storage (at the offset specified by the page offset).

In an alternative embodiment, the channel, die, page and page-offset sub-addresses (or any subset thereof) recovered from the LBA are also virtual addresses and thus supplied to respective sub-address translation or lookup tables (Ch LUT, Die LUT, Pg LUT, PO LUT) to obtain or generate the corresponding physical sub-addresses. More generally, any or all of the sub-address fields (including the page offset) recovered from the inbound LBA may be virtual addresses that are converted to physical addresses through translation/lookup operations. Also, two or more of the lookup tables for different hierarchical levels may be merged or combined. For example, the channel and die lookup tables may be merged to enable a two-dimensional lookup, thus virtualizing the die array as a whole and enabling any die on any channel to be interchanged (i.e., through virtual-to-physical address translation) with any other die on the same channel or any other channel.

A conceptual view of an erase-unit virtual-to-physical (V2P) translation table implementation is shown conceptually in the bottom portion of FIG. 7 to demonstrate that a channel and die, selected by one of numerous constituent erase-unit lookup tables (or translation tables) is selected to yield the physical erase-unit address (i.e., to provide for independent erase-unit mapping from die to die). Various other implementations may be deployed in alternative embodiments.

A number of points bear emphasis in view of FIG. 7. First, as the individual sub-address fields are, by virtue of block device and ASL programming, modulo-encoded into the incoming logical block address (e.g., as respective bit-fields in the power-of-two example shown), the sub-address values may be deterministically (e.g., algorithmically) recovered from the logical block address extremely quickly and efficiently, avoiding altogether the generally enormous translation data storage (e.g., trie structures and the like) and extensive translation times required for FTL operating modes or implementations. Moreover, the very presence of the sub-address values within the logical block address (i.e., the logical block address may be viewed as a tuple of the hierarchical sub-address values made possible by the pseudo-physical specification of the block device and in which the sub-address values that form the tuple may be re-ordered in a variety of ways and even fragmented in accordance with the user-specified address space layout for a block device or subspace therein) effects an assurance to the host that LBAs containing the same sub-addresses down to a given hierarchical level will resolve to the same physical resource. For example, LBAs containing the same channel sub-address are ensured to access a die on the sub-address-identified channel. Similarly, LBAs containing the same channel and die sub-addresses are ensured to access an erase unit within the same die, and so forth. Moreover, any of the sub-addresses may be encoded into the LBA as a virtual address—that is a sub-address value that virtualizes the corresponding (and compartmentalized) physical resource. Thus, even though a given LBA may be assured to resolve to a desired die (virtual or physical), a virtualized erase-unit sub-address enables the underlying physical resources within that die to be swapped in and out of service as necessary, all without impacting the linear address space and performance perceived by the host.

Also note that the depicted architecture permits address translation to be reduced to relatively simple operations that can be implemented using logic gates and lookup tables, that is, in a manner that can be performed extremely fast, e.g., on an intra-cycle basis (i.e., in less than a clock cycle) or at most using only a handful of clock cycles. For example, as will be discussed below, a memory controller can offload address translation to a set of logic gates and prepopulated lookup tables, which can perform address translation without requiring processor clock cycles. On-board logic can then update the lookup tables and/or metadata as appropriate, in a manner that does not encumber I/O latency. By contradistinction, conventional flash memory tables which map a logical page address to potentially any wordline in flash memory device typically require gigabit-size translation tables, with translation only being performed using a substantial number of using processor cycles. This architecture, once again, helps streamline I/O latency, rendering it far more predictable, and reduces address translation time to a negligible quantity.

As discussed above, the exemplary ASL bit-field maps shown in FIG. 7 for the different block devices assume a power-of-two quantity of physical resources at each hierarchical level in the flash. In the more general case, the resources at any or all physical levels may not be power-of-two quantities and thus complicate the picture of sub-address encoding. For example, assuming a 3-channel, 5-die block device allocation in which each die contains 2000 pseudo-physical erase units and 400 pages per erase unit, the total LBA range (assuming four LBAs per page) will span from 0 to 3*5*2000*400*4 (where '*' denotes multiplication) and thus from 0 to 48,000,000-1 and thus only part of the range represented by the smallest sufficient binary address size $2^{26}$. Moreover, because each element of the tuple that constitutes a given logical block address ranges between 0 and a non-power-of-2 maximum (i.e., magnitude of individual tuple elements are not, in all cases, power of 2 numbers), the sub-addresses of different hierarchical groups of structures (i.e., channels, dies, erase units, pages, etc.) do not fall within discrete bit fields. Said another way, the power-of-two ASL examples shown in FIG. 7 are a special case of a more general solution in which sub-address fields are recovered using modulo arithmetic that reflects the tuple composition of the logical block address. Once again, as depicted, such an architecture can be easily implemented entirely or primarily in hardware, thus reducing translation times to negligible levels.

Figure 8:
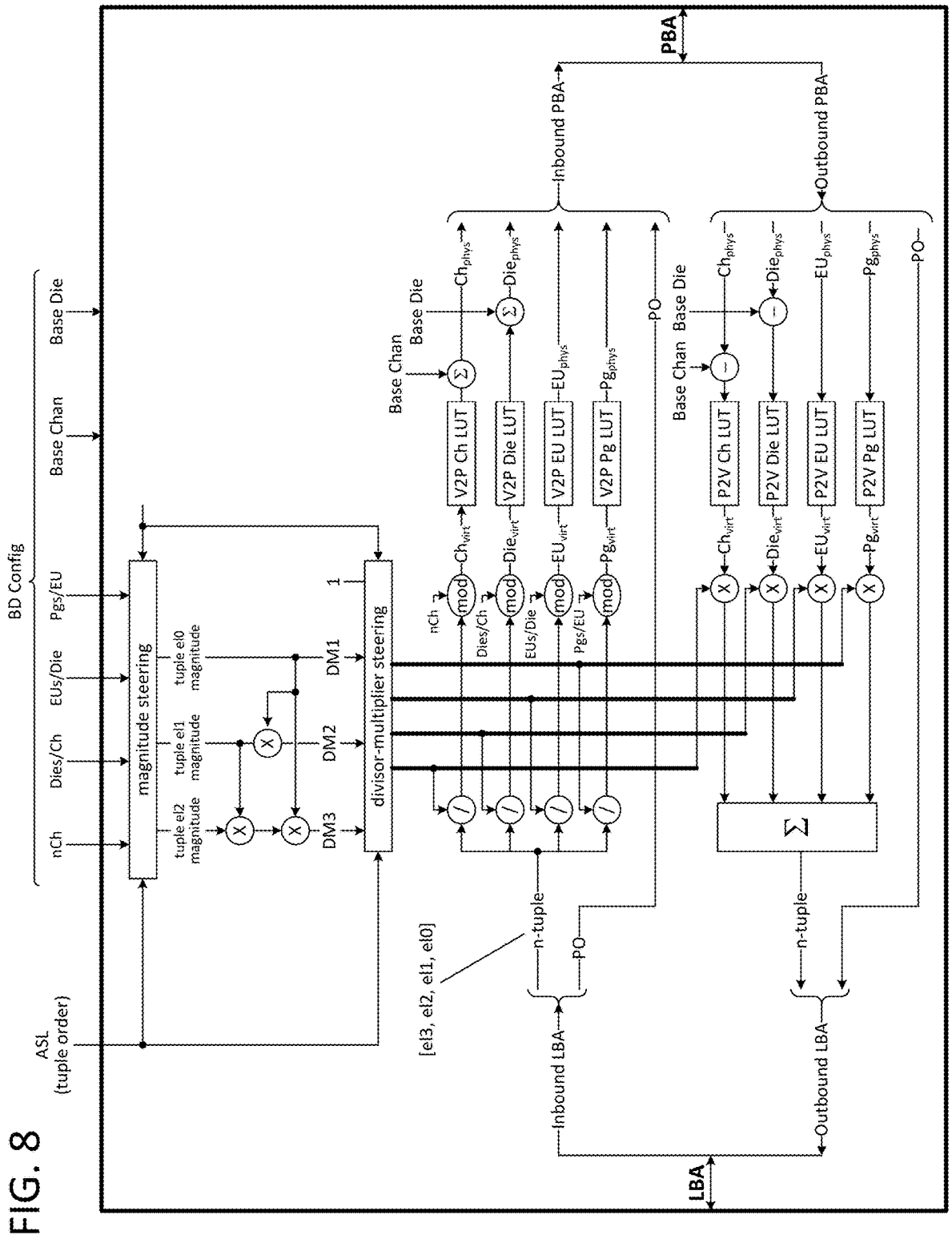
FIG. 8 illustrates a conceptual implementation of an address generation module.

FIG. 8 illustrates a conceptual implementation of an address generation module that may be used to extract (or recover) sub-address values from an inbound LBA regardless of whether the magnitude of individual tuple elements (i.e., number of channels, number of dies/channel, number of erase units/die, number of pages/erase unit) are power-of-two numbers or not. As in FIG. 7, any or all of the hierarchical sub-address values, once recovered, may be converted from virtual to physical sub-addresses to collectively form an inbound physical block address (PBA), adding offsets to reflect the base channel and base die of the block device. For reasons discussed in further detail below, the address generator is implemented bi-directionally. That is, essentially the same operations executed to yield a PBA from an inbound LBA may be executed in reverse to produce an outbound LBA from a physical block address, thus enabling status regarding a given physical resource within the flash device to be reported to the host in terms of the LBA mapping that the host understands. Note that this information can be used to provide context to a host in order for a host to schedule maintenance or data movement (e.g., data migration or garbage collection) to preselected locations (e.g., where the logical address locations corresponding to the data are matched to the wear of a destination physical location, or where logical address locations having similar age, write frequency and/or read frequency characteristics are grouped together), as discussed in the copending application "Techniques for Data Migration Based On Per-Data Metrics and Memory Degradation" which as been incorporated by reference, as noted earlier.

Referring first to the inbound LBA path, an ASL value (e.g., generated per the ASL lookup table entry as discussed in reference to FIG. 7) that describes the order of tuple elements within the inbound LBA is supplied to a pair of steering circuits that yield a set of divisors—products of individual tuple elements. More specifically, a magnitude steering circuit selects, as magnitudes of the three least significant tuple elements within the inbound LBA (a four-tuple LBA is assumed in this example, having as tuple elements, a channel sub-address, die sub-address erase-unit sub-address, and page sub-address in any order), from among the block device configuration settings for structural element quantities (i.e, number of allocated channels, number of allocated dies, number of allocated erase units, number of allocated pages) to produce divisor values that reflect strides within the LBA (after scaling to account for the page offset—the "scaled LBA" or "offset-scaled LBA") at which boundaries between different members of the same structural group occur. Thus, in the 3-channel, 5-die, 2000 erase-unit, 400 page example above, if the tuple elements are ordered from most to least significant as channel sub-address, die sub-address, erase-unit sub-address, page sub-address, then the tuple element magnitudes will be 400, 2000, and 5, for elements 0, 1 and 2, respectively. Accordingly, the divisors supplied to the divisor steering logic will be DM1=200, DM2=400*2000=800,000 and DM3=400*2000*5=4,000,000. The divisor steering logic serves to route the divisors to the appropriate sub-address generation paths according to the tuple order specified in the ASL value and thus, continuing with the 3 channel, 5 die, 2000 erase unit, 400 page example (i.e., in tuple notation: "(3,5, 2000, 400)"), the channel sub-address path will receive the 400*2000*5 divisor (reflecting that a different channel is specified at each 4,000,000 increment in the scaled LBA), the die sub-address path will receive the 400*2000 divisor (reflecting that a different die is specified at each 800,000 increment in the scaled LBA) and the erase-unit sub-address path will receive the 400 divisor (reflecting that a different erase unit is specified at each 400 increment in the scaled LBA). The sub-address path for the least significant tuple element will receive a unity divisor (i.e., '1'), reflecting that a different page is specified at each increment of the scaled LBA.

Still referring to the inbound LBA path of FIG. 8, after divisors have been applied to the scaled LBA (i.e., integer division as reflected by the '/' operator in divider logic elements), the results (integer-valued quotients) are subject to modulo operations (i.e., modulo 400, 2000, 5 and 3 for the respective sub-addresses) within the "mod" logic elements to yield sub-address values which, in the example shown, are assumed to be virtual sub-address values. As shown, the virtual sub-addresses are supplied to respective (or joint) lookup/translation modules to generate physical sub-address counterparts generally as described above in reference to FIG. 7. Any or all of the modulo logic outputs may be physical sub-address values in alternative embodiments.

Still referring to FIG. 8, the outbound PBA/LBA path is essentially the reverse of the inbound path, converting physical sub-address into virtual sub-addresses as necessary, multiplying by the steered divisor value (now a multiplier and hence a "divisor-multiplier"), and then summing the multiplied sub-address values to form the four-tuple LBA output (merging in the page offset to yield the full-range rather than offset-scaled LBA).

Figure 9:
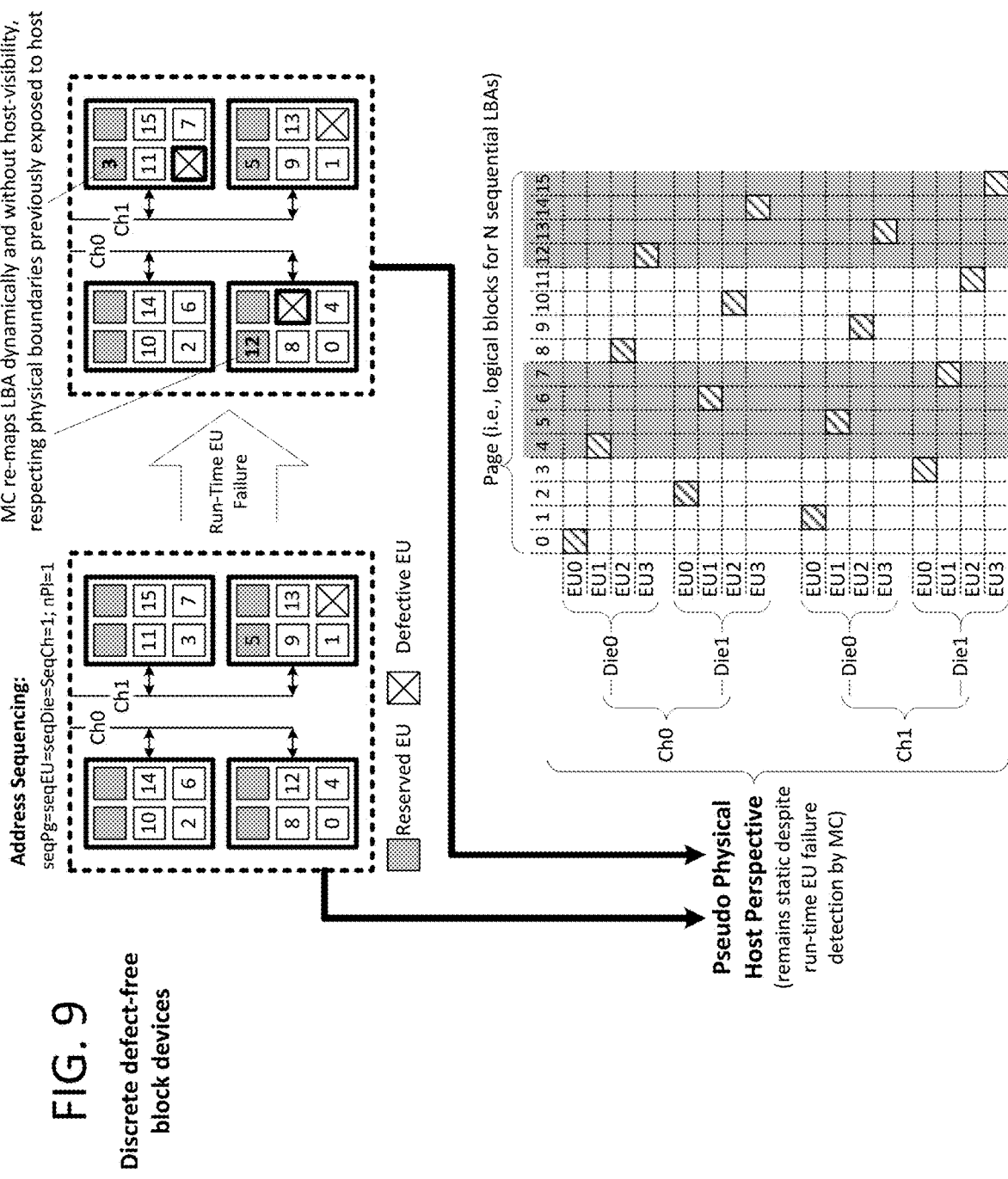
FIG. 9 illustrates exemplary virtualization of erase units within a four-die block device.

FIG. 9 illustrates an exemplary virtualization of erase units within a four-die (2 dies by 2 channels) block device that demonstrate the discrete defect-free block device exposition enabled by the various pseudo-expositive flash device embodiments described above. In the example shown, the ASL is configured similarly to that of block device in the left-most portion of FIG. 6, but with only single-plane operation, thus establishing a four-page stripe width. For purposes of example the erase units into which the first sixteen pages of data are enumerated within the erase-unit elements themselves. Further, it is assumed that the erase unit population is larger than the virtual erase unit address field within each incoming LBA such that some number of spare erase units is available within each die. Accordingly, upon determining that the erase unit shown at the bottom right corner of the fourth die is defective, the pseudo-expositive memory controller remaps the LBA that would otherwise resolve to the defective erase unit to a spare erase unit within the same die. That is, the fifth page of data that might otherwise be written to the defective erase unit is, through translation of the virtual address field within the incoming LBA to a physical address field as discussed above, re-directed to the spare page entirely transparently to the host write requestor. Impending run-time detected erase-unit failures in dies marked 'X' result in similar re-mapping and data move operations (i.e., prior to complete failure of the suspect erase units) again permitting the host to perceive the block device as a discrete defect-free storage entity. As discussed above, any other resources within the structural hierarchy of the flash device (including particularly those most likely to fail), such as dies, planes, pages or even channels may be virtualized and pseudo-exposed to the host in a manner that preserves one or more spares. In all such cases, the host may configure the number of structural elements reserved as spares on a flash-device-wide or block-device basis, for example, after requesting and receiving a physical geometry description from the flash device, including a reporting of the number of failed or suspect elements at each level of the structural hierarchy. Such spare-setting (or reserve pool specification) may be carried out, for example, in connection with block device programming within the block device allocator described above in reference to FIG. 2 (e.g., programming the number of spares to be reserved, percentage of spares to be reserved, size of virtual address field and thus the allocable number of structural elements, etc.) and may be assisted by receiving a default reserve pool recommendation from the memory controller (which default may be applied to allocated block devices absent host programming of a different setting.

Still referring to FIG. 9, the pseudo-physical host perspective of block device remains static and defect free, despite ongoing failure events (and/or removal of erase units or other virtualized structural elements from service for wear leveling, garbage collection, scrubbing or other maintenance or operational reasons). The remapping of address information by the memory controller using the identified translation scheme once again helps streamline I/O latency, as discussed earlier.

FIG. 10 demonstrates an exemplary sequence of operations coordinated between the pseudo-expositive flash memory controller and host file server to enable host-scheduled maintenance of flash-device-identified units of data, and more specifically segments in this example. The device tracks statistics and environmental status of the memory looking for indications that a portion of the data needs maintenance driven by a physical resource. An example of a maintenance operation might be that data has resided on a given EU for a time long enough to approach a maximum estimated safe retention time. An event could be set to trigger at a threshold of safety previously selected by to host and communicated to the device. Once that event has been triggered, the device translates the physical location though the previous block device and ASL map structures in order to identify the segment as a host LBA in which the physical resource resides. When the host has received the notification of the event, along with the associated segment LBA address, length, and event type, the host may elect to handle that event in a number of ways. Host issued instructions may garbage collect, copy, move, or discard data in manner the best benefits the overall efficiency of the system. Those instructions may be mixed into the overall system scheduling. Note that in contradistinction to conventional approaches (e.g., where an entire address space is garbage collected, in a device-wide operation delegated to a memory controller) that this approach permits the host to command specific maintenance operations to specific hierarchies, for example, by command to perform maintenance on a specific EU; to this effect, the host transmits a maintenance command with a specific block address, which the memory controller uses to perform maintenance on a host-selected or host-specified address range, conveyed by or in connection the maintenance command. Once data has been relocated or discarded, a segment of interest may be erased.

FIG. 11 illustrates a forward (and reverse) compatibility between successive flash generations that is enabled by the pseudo-expositive flash device in combination with the block device allocator discussed above in reference to FIG. 2. Assume, for example, that the block device allocator was initially executed in connection with a generation 'A' flash device having a page size 'K', to configure a block device having a four-page stripe size. For ease of illustration, the K-sized pages are assumed sufficiently large that each erase unit contains only two pages, and that each host segment spans four erase units. Thus, a first host segment ("Seg0") is striped across the four dies of the block device and fills erase unit 0 within each die, being stored in eight pages total (pages 0-7), while a second host segment ("Seg1") is stored within erase unit 1 of the four dies and thus in pages 8-15. Assume as a forward-compatibility example, that a next generation "GenB" flash device is to be deployed in combination with or in place of a "GenA" flash device, and that page size has doubled to 2K so that the overall flash device capacity has doubled in GenB (i.e., there are the same number of pages per erase unit, erase units per die, dies per channel and channels as in the GenA device so that the doubled page size doubles the capacity of every element in the structural hierarchy). In this case, assuming further that the page read and write times ($t_{READ}$ and $t_{PROG}$) have also doubled between the two flash device generations, then the user/designer may re-run the block device allocator with an unchanged set of block device specifications (i.e., in terms of read and write bandwidth, at least) to yield a block device allocation and ASL within the GenB device that matches the performance characteristics of the counterpart block device within the GenA flash device, albeit at double capacity. For example, as shown in FIG. 11, the block device allocator may define the ASL such that the stripe width still spans four pages (i.e., a page within each of the four allocated dies) so that the reduced write bandwidth (due to the 2× higher GenB tProg) is offset by the doubled page size. Thus, the two segments previously stored within the GenA drive may be written to the GenB drive with the same bandwidth, but now occupy only half the number of erase units (as their capacity has doubled) as in the GenA storage. Note that Seg1 may, through different ASL specification, be stored within dies 0 and 1 of the GenB flash device instead of dies 2 and 3, thus raising endurance of the flash device at the cost of reduced write bandwidth. Changing the example so that the tPROG and tREAD times remain unchanged in the GenB device, then the alternative segment 1 storage destination (i.e., alternative ASL specification) within dies 0 and 1 may be preferable, as the two-die stripe size in the GenB device would yield the same write bandwidth as the four-die stripe size in the GenA device. That is, sequencing more narrowly through dies 0 and 1 (instead of more broadly across all four dies) will yield a higher endurance result with approximately the same read/write bandwidth. As discussed above, the ASL may be further tuned to yield a desired balance between endurance and I/O bandwidth.

Figure 12:
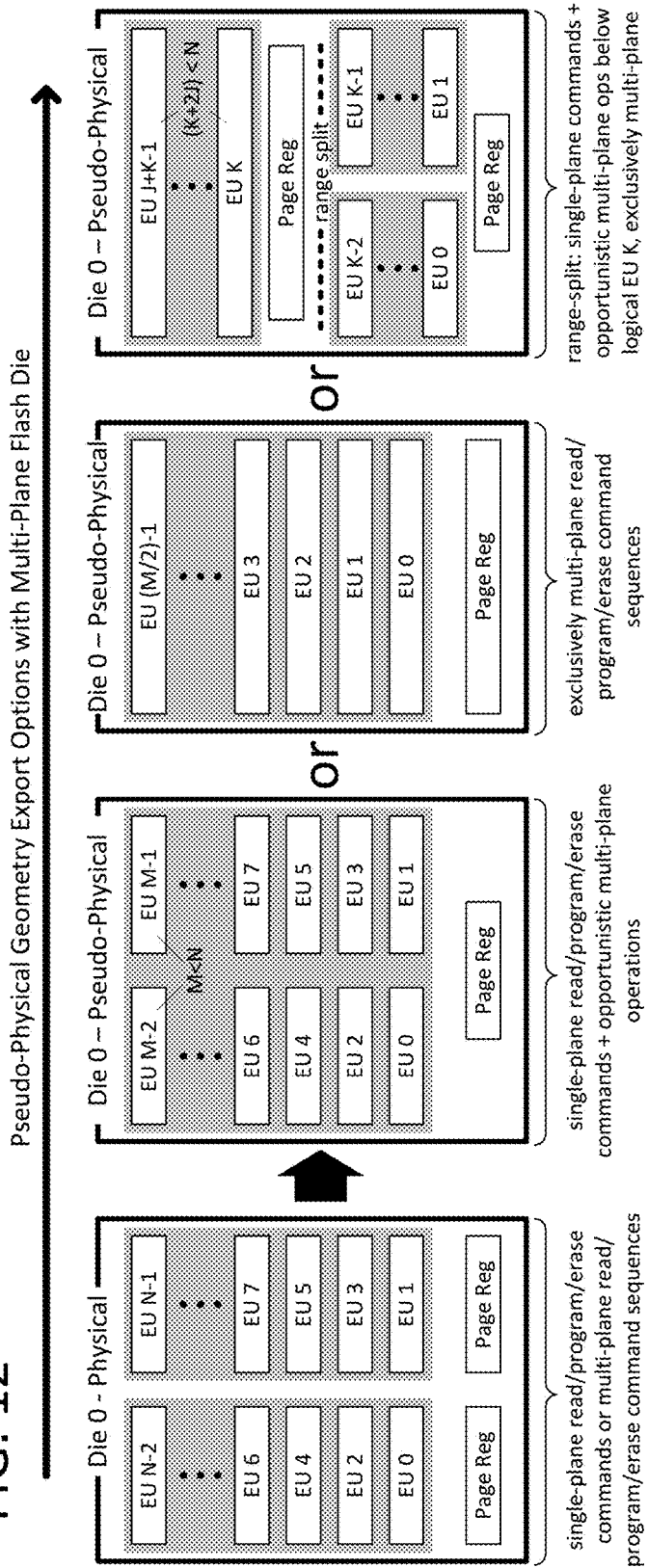
FIG. 12 illustrates detail regarding pseudo-physical geometry export options within a flash device having multi-plane flash dies.

FIG. 12 illustrates more detail regarding pseudo-physical geometry export options within a flash device having multi-plane flash dies. In the particular example shown, it is assumed that each die within the flash device, exemplified by "Die 0" includes N erase units distributed evenly between even and odd erase-unit planes (i.e., N/2 erase units per plane). In general, the die may be switched on the fly, according to incoming command sequences, between single-plane and multi-plane operation. Once again, therefore, the same die ("Die 0") is illustrated in duplicate to discuss multiple alternate configurations; the pseudo-expositive memory controller may operate the die in one of several different pseudo-physical modes including, an opportunistic single-plane mode, an exclusively multi-plane mode, and a range-split hybrid mode in which a portion of the pseudo-physical or physical erase units within the die are operated in opportunistic single-plane mode and another portion of the erase units are operated in exclusively multi-plane mode. In each of the pseudo-physical operating modes, the erase unit field of an incoming LBA resolves to fewer than N erase units. For example, the erase unit field resolves to any one of M erase units in single-plane mode, to any one of M/2 double-width erase units (i.e., logical combination of paired erase units drawn respectively from the odd and even planes) in dual plane mode and any one of K single-plane erase units or J double-width erase units in the hybrid split-range mode, where M<N and K+2J<N.

In opportunistic single-plane mode, the flash die is generally accessed one erase-unit at a time (or more accurately one page within one erase unit at a time, for reads and writes), occasionally executing a dual-plane command where a pair of successive accesses are directed respectively to erase units within the odd and even planes. By contrast, when configured for dual plane mode, each host requested memory access is translated by the memory controller into a dual plane command sequence that accesses a matched pair of erase units within each of the odd and even planes (i.e., one odd-plane erase unit and a counterpart even-plane erase unit). Accordingly, the page registers and erase units are viewed, from a pseudo-physical perspective, as double-width elements as compared to individual page registers and erase units in single-plane mode. Moreover, the total number of erase units is halved (by the effective merging of the two planes) so that the pseudo physical address range is reconfigured to account for half the number of virtually addressable erase units within the die, and double the number of logical blocks per page.

Still referring to FIG. 12, the split-range hybrid mode, due to its dual range-divided configuration, permits single-plane commands and opportunistic multi-plane command sequences within the single-plane address range (i.e., logical addresses that resolve to erase units below pseudo-physical erase unit K), and requires exclusively multi-plane command sequences within the dual-plane address range. In alternative embodiments, the ordering of the dual-plane and single-plane ranges may be reversed (i.e., dual-plane at lower rather than higher-ordered addresses) and the total number of different ranges may be greater than the two shown.

Figure 13:
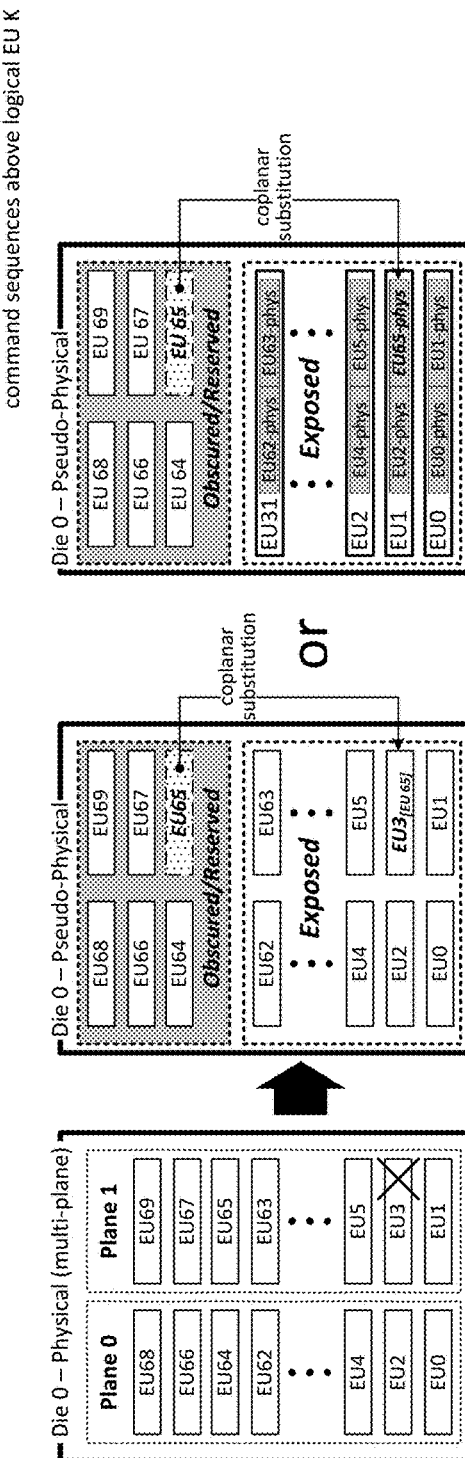
FIG. 13 illustrates additional operations that may be managed by embodiments of pseudo-exposition.

FIG. 13 illustrates additional operations that may be managed by embodiments of the pseudo-exposition. Once again, "Die 0" is shown in multiple, alternate configurations. A defective erase unit detected within a given plane of a multi-plane capable die may be mapped (logically replaced) by an otherwise reserved erase unit within the same plane as shown in the two pseudo-physical views of die zero. This enables opportunistic multi-plane operations to continue when the die is configured for single-plane operation, and permits multi-plane operations to proceed entirely transparently to the host.

Figure 14:
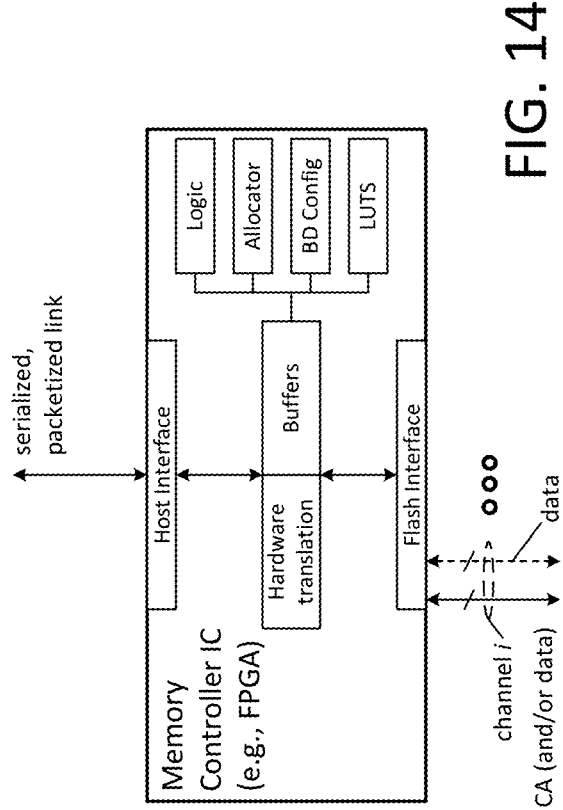
FIG. 14 illustrates a memory controller integrated circuit (IC).

FIG. 14 illustrates one embodiment of various techniques illustrated above, implemented as a memory controller integrated circuit (IC). As noted by the figure, in one version, such an IC can be implemented as a field-programmable gate array (FPGA) having logic gates and lookup tables (e.g., circuitry) configured to provide fast address translation as discussed above; this is not required for all embodiments, and in other contemplated embodiments, a memory controller can be implemented as a special purpose processor or other preconfigured integrated circuit, with or without the use of support software (e.g., firmware). As depicted by the figure, the IC includes a host interface, which for example, uses a standard communication interface framework (e.g., non-volatile memory express, or NVME or Serial ATA) for packetized communications, where packets comprise commands, address and data, as appropriate; note that this interface can be shared for commands directed to different channels or devices, i.e., the commands and data to respective channels and/or dies are typically MUX'ed over this channel for exchange between the memory controller IC and the host. Similarly, as discussed earlier, the memory controller features a flash interface, whereby one or more channels are used to communication with one or more memory devices. Each channel can consist of a set of links for address and/or data (e.g., for packetized communication of address and data over a set of eight links), or can feature separated address and databusses (as depicted by the optional, dashed-line links designated for "data"). The memory controller IC also features hardware translation circuitry as mentioned (e.g., with ASL parameters being used to configure address wrapping and distinction between hierarchical levels and with LUTs used for address mapping at selected or predetermined levels of the hierarchy) and buffers for buffering commands and/or data transfer as appropriate. In addition, the memory controller IC in this embodiment can include supervisory logic (e.g., for responding to host queries, performing LUT updates, and configuring parameters as appropriate, as well as for controlling sequencing and maintenance operations in memory), a block-device designer and allocator section as discussed earlier in connection with FIG. 2, and block device configuration elements, as appropriate. In one embodiment, some or all of these functions can be implemented in the form of instructions stored on non-transitory machine-readable media (e.g., firmware or software, for controlling one or more cores or processors).

It should be noted that, as a step in their fabrication or other reification, the various circuits disclosed herein may be described using computer aided design tools and expressed (or represented) as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process. Any of the various methods and operational sequences herein may likewise be recorded as one or more sequences of instructions on a computer-readable medium and may be executed on a computing device to effectuate the disclosed method and/or operational sequence.

Also, as noted, many of the techniques described herein can be employed in an apparatus, a method, an integrated circuit, a system on-chip, a memory device, a memory controller, a host processor, as a circuit description (i.e., that contains data structures defining fabrication parameters for a processor, integrated circuit, device, or components of any of these things), as instructions stored on machine-readable media (e.g., firmware or software intended for execution on one or more general purpose machines), or as combinations of these things. In the case of software or other instructional logic, the instructions are typically written or designed in a manner that has certain structure (architectural features) such that, when they are ultimately executed, they cause the one or more general purpose machines or hardware to behave as special purpose machines, having structure configured by the instructions to necessarily perform certain described tasks. "Non-transitory machine-readable media" as used herein means any tangible (i.e., physical) storage medium, irrespective of how data on that medium is stored, including without limitation, random access memory, hard disk memory, optical memory, a floppy disk or CD, server storage, volatile memory and other tangible mechanisms where instructions may subsequently be retrieved by a machine. The machine-readable media can be in standalone form (e.g., a program disk) or embodied as part of a larger mechanism, for example, a storage drive, CPU, laptop computer, portable or mobile device, server, data center, "blade" device, subsystem, electronics "card," storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or different processors, depending on embodiment. For example, in one implementation, instructions on non-transitory machine-readable media can be executed by a single computer and, in other cases as noted, can be stored and/or executed on a distributed basis, e.g., using one or more servers, web clients, or application-specific devices. Each function mentioned in the disclosure or FIGS. can be implemented as part of a combined program or as a standalone module, either stored together on a single media expression (e.g., single floppy disk) or on multiple, separate storage devices. The same is also true for a circuit description for fabricating cores, processors, devices or circuits described herein, i.e., the result of creating a design can be stored in non-transitory machine-readable media for temporary or permanent use, either on the same machine or for use on one or more other machines; for example, a circuit description or software can be generated using a first machine, and then stored for transfer to a printer or manufacturing device, e.g., for download via the internet (or another network) or for manual transport (e.g., via a transport media such as a DVD) for use on another machine. Throughout this disclosure, various processes will be described, any of which can generally be implemented as instructional logic (instructions stored on non-transitory machine-readable media), as hardware logic, or as a combination of these things. Depending on product design, such products can be fabricated to be in saleable form, or as a preparatory step for other processing that will ultimately create finished products for sale, distribution, exportation or importation.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, device geometries and numbers of hierarchical structural elements (e.g., channels, dies, planes, erase units, pages, etc.), component circuits or devices and the like may be different from those described above in alternative embodiments. Additionally, links or other interconnection between integrated circuit devices or internal circuit elements or blocks may be shown as buses or as single signal lines. Each of the buses may alternatively be a single signal line, and each of the single signal lines may alternatively be buses. Signals and signaling links, however shown or described, may be single-ended or differential. A signal driving circuit is said to "output" a signal to a signal receiving circuit when the signal driving circuit asserts (or deasserts, if explicitly stated or indicated by context) the signal on a signal line coupled between the signal driving and signal receiving circuits. The term "coupled" is used herein to express a direct connection as well as a connection through one or more intervening circuits or structures. Device "programming" may include, for example and without limitation, loading a control value into a register or other storage circuit within an integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement.

While the invention has been described with reference to specific embodiments thereof, it will be evident that various modifications and changes may be made thereto without departing from the broader spirit and scope. For example, features or aspects of any of the embodiments may be applied in combination with any other of the embodiments disclosed herein and/or in materials incorporated by reference or in place of counterpart features or aspects thereof. Accordingly, the specification and drawings are to be regarded in an illustrative rather than a restrictive sense.

What is claimed is:

1. A storage drive comprising:
a memory controller having an interface to receive commands and associated addresses from a host; and
nonvolatile memory comprising storage units at a hierarchically-superior level, each storage unit at the hierarchically-superior level comprising a programmably-selected number of one or more dies of the nonvolatile memory and being associated with a respective set of storage units at a hierarchically-inferior level;
wherein the memory controller further comprises a register to store programmable configuration parameters for the storage drive, including first values respective to the storage units at the hierarchically-superior level which determine corresponding host-accessible sets of addresses to be respectively mapped to the storage units at the hierarchically-superior level and the programmably-selected number of the one or more dies of the nonvolatile memory respectively associated with the storage units at the hierarchically-superior level, and second values respective to the storage units at the hierarchically-superior level which determine a number of the storage units at the hierarchically-inferior level in the respective set that is to be held in reserve for corresponding ones of the storage units at the hierarchically-superior level;
wherein the memory controller further comprises circuitry to execute each given one of the commands from the host by
identifying one of the storage units at the hierarchically-superior level dependent on the associated address for the given one of the commands, and
identifying a physical address corresponding to one of the storage units at the hierarchically-inferior level which has been mapped to the corresponding host-accessible set of addresses for the identified one of the storage units at the hierarchically-superior level; and
wherein the memory controller further comprises circuitry to track metadata for respective storage units of the nonvolatile memory and to transmit information to the host based on said metadata, the information indicating an extent to which the respective storage units are unutilized and can continue to receive additional write data without being erased.

2. The storage drive of claim 1 wherein the memory controller comprises circuitry to receive programming from the host and to selectively configure at least one of the first values in response to the host programming.

3. The storage drive of claim 1 wherein the memory controller comprises circuitry to receive programming from the host and to selectively configure at least one of the second values in response to the host programming.

4. The storage drive of claim 1 wherein the memory controller comprises circuitry to receive programming from the host and to selectively configure the first values and the second values respective to each of the storage units at the hierarchically-superior level in response to the host programming.

5. The storage drive of claim 1 wherein each of the storage units at the hierarchically-superior level comprises a virtual device.

6. The storage drive of claim 1 wherein each of the storage units at the hierarchically-superior level comprises mutually-exclusive sets of structures, each of the structures being one of a physical channel and a physical die.

7. The storage drive of claim 1 wherein the memory controller comprises circuitry to perform at least one of wear leveling and garbage collection on an independent basis for each storage unit at the hierarchically-superior level.

8. The storage drive of claim 7 wherein the nonvolatile memory is flash memory, wherein the memory controller is embodied as a flash memory controller integrated circuit, and wherein each of the storage units at the hierarchically-inferior level is an erase unit.

9. The storage drive of claim 1 wherein the memory controller further comprises circuitry to, on an independent basis for each respective set, exchange ones of the storage units at the hierarchically-inferior level held in reserve for the respective set for ones of the storage units at the hierarchically-inferior level which have been mapped to the corresponding host-accessible set of addresses for the respective set.

10. The storage drive of claim 9 wherein the circuitry to exchange is to do so in dependence on at least one register setting respective to a given one of the storage units at the hierarchically-superior level, the at least one register setting defining a host-configurable endurance characteristic for the given one of the storage units at the hierarchically-superior level.

11. The storage drive of claim 1 wherein:
the circuitry to execute each given one of the commands is to identify at least one register entry respective to a given one of the storage units at the hierarchically-superior level that is to be accessed in association with one of the commands; and
the memory controller further comprises address translation circuitry to generate the physical address as a function of the register entry specific to the identified one of the storage units at the hierarchically-superior level.

12. The storage drive of claim 1 wherein the memory controller further comprises circuitry to, in conjunction with an operation in the non-volatile memory affecting a particular physical location:
generate an address corresponding to the particular physical location, in a manner dependent on an address value for one of the storage units at the hierarchically-superior level and exactly one of the storage units at the hierarchically-inferior level in the respective set corresponding to the particular physical location; and
transmit the generated address to the host.

13. The storage drive of claim 12 wherein the circuitry to generate the address is to perform modulo arithmetic upon the address value for the one of the storage units at the hierarchically-superior level corresponding to the particular physical location and an address value for the exactly one of the storage units at the hierarchically-inferior level in the respective set in order to generate the address to be transmitted to the host.

14. The storage drive of claim 1 wherein the circuitry to execute comprises address translation circuitry that is to translate each given associated address differently dependent on one of the storage units at the hierarchically-superior level which is specified by an address field subset of the given associated address, and dependent on at least one register setting respective to the one of the storage units at the hierarchically-superior level which is specified by the address field subset.

15. The storage drive of claim 14 wherein each respective register setting comprises at least one host-configurable address mapping value that is one of:

a number of sequential associated addresses before a channel address is to be changed;
a number of sequential associated addresses before a die address is to be changed;
a number of sequential associated addresses before an erase unit address is to be changed; and
a number of sequential associated addresses before a page address is to be changed.

16. The storage drive of claim 1 wherein the circuitry to execute comprises address translation circuitry that is to translate each associated address differently dependent on an address field subset of the associated address, and dependent on an address translation table respective to the one of the storage units at the hierarchically-superior level corresponding to the address field subset.

17. The storage drive of claim 1 wherein:
the hierarchically-inferior level is a first hierarchically inferior level;
the nonvolatile memory also comprises storage units at a second hierarchically-inferior level, each of the storage units at the hierarchically-superior level associated with a respective, mutually-exclusive subset of the storage units at the hierarchically-inferior level, each of the storage units at the first hierarchically-inferior level comprising a respective, mutually-exclusive set of the storage units at the second hierarchically-inferior level;
the circuitry to execute is to subdivide each associated address into first and second address portions, is to identify, for each associated address, one of the storage units at the hierarchically-superior level dependent on the corresponding first address portion, is to identify one of the storage units at the first hierarchically-inferior level in the mutually-exclusive subset which is respective to the identified one of the storage units at the hierarchically-superior level dependent on the second address portion, and is to identify the physical address dependent on the identified one of the storage units at the hierarchically-superior level and the identified one of the storage units at the first hierarchically-inferior level; and
the circuitry to execute is to translate each associated address differently, dependent on at least one of the corresponding first address portion and the corresponding second address portion.

18. The storage drive of claim 17 wherein:
each associated address comprises bits;
the first address portion corresponds to a first subset of the bits;
the second address portion corresponds to a second subset of the bits; and
the first subset and the second subset are non-overlapping.

19. The storage drive of claim 1 wherein:
the commands include write commands;
for each of the write commands, the circuitry to execute is to subdivide the associated address into first and second address portions, is to identify, for the associated address, one of the storage units at the hierarchically-superior level dependent on the corresponding first address portion; and
the circuitry to execute is to automatically identify the physical address from first address portion and the second address portion, according to a programmable parameter that is respective to the identified one of the storage units at the hierarchically-superior level.

20. The storage drive of claim 1 wherein each of host-accessible sets of addresses to be respectively mapped to the storage units at the hierarchically-superior level is a continuous range of addresses.

21. The storage drive of claim 1 wherein the storage units at the hierarchically-inferior level are erase units, and wherein the programmable configuration parameters further comprise third values effective to determine, for each specific die of the nonvolatile memory associated with one of the storage units at the hierarchically-superior level, a number of erase units to be held in reserve for the specific die.

22. The storage drive of claim 1 wherein the memory controller comprises circuitry to perform garbage collection on an independent basis for each storage unit at the hierarchically-superior level.

23. The storage drive of claim 1 wherein the storage units at the hierarchically-inferior level comprises respective ones of the dies of the nonvolatile memory.

24. The storage drive of claim 1 wherein:
the memory controller further comprises circuitry to, in conjunction with an operation in the non-volatile memory affecting a particular physical location,
generate an address corresponding to the particular physical location, in a manner dependent on an address value for one of the storage units at the hierarchically-superior level and exactly one of the storage units at the hierarchically-inferior level in the respective set corresponding to the particular physical location, and
transmit the generated address to the host; and
for each one of the commands from the host which is directed to data stored at the particular physical location, including one or more read commands, the corresponding associated address provided by the host is dependent on the generated address.

25. The storage drive of claim 1 wherein the nonvolatile memory is flash memory,
wherein the memory controller is embodied as a flash memory controller integrated circuit, and wherein each of the storage units at the hierarchically-inferior level comprises erase units.

26. The storage drive of claim 1 wherein the respective storage units comprise at least one of storage units at the hierarchically-superior level or storage units at the hierarchically-inferior level, and wherein information to be transmitted to the host based on said metadata indicates an extent to which at least one of storage units at the hierarchically-superior level or storage units at the hierarchically-inferior level can continue to receive additional write data without being erased.

27. The storage drive of claim 1 wherein the respective storage units each comprise physical storage locations in the nonvolatile memory, and wherein information to be transmitted to the host based on said metadata indicates an extent to which at least one set of the physical storage locations can continue to receive additional write data without physically being erased.

28. The storage drive of claim 1 wherein the nonvolatile memory is flash memory, and wherein information to be transmitted to the host based on said metadata indicates an extent to which at least one set of physical erase units of the flash memory can continue to receive additional write data without physically being erased.

* * * * *